US012739084B2

(12) United States Patent
Liu

(10) Patent No.: US 12,739,084 B2
(45) Date of Patent: Sep. 15, 2026

(54) DATA TRANSMISSION METHOD AND APPARATUS

(71) Applicant: HUAWEI TECHNOLOGIES CO., LTD., Shenzhen (CN)

(72) Inventor: Yun Liu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 258 days.

(21) Appl. No.: 18/764,102

(22) Filed: Jul. 3, 2024

(65) Prior Publication Data

US 2024/0372686 A1 Nov. 7, 2024

Related U.S. Application Data

(63) Continuation of application No. PCT/CN2022/142457, filed on Dec. 27, 2022.

(30) Foreign Application Priority Data

Jan. 5, 2022 (CN) ........................ 202210007015.5
Feb. 28, 2022 (CN) ........................ 202210191913.0

(51) Int. Cl.
*H04L 5/00* (2006.01)
*H04W 72/0453* (2023.01)

(52) U.S. Cl.
CPC ............ *H04L 5/0092* (2013.01); *H04L 5/008* (2013.01); *H04W 72/0453* (2013.01)

(58) Field of Classification Search
None
See application file for complete search history.

(56) References Cited

U.S. PATENT DOCUMENTS

2006/0072533 A1* 4/2006 Smee .................... H04L 1/1887 370/342
2016/0218832 A1* 7/2016 Dabeer ................ H04L 1/0073
2017/0207884 A1* 7/2017 Jiang ........................ H04L 1/08
(Continued)

FOREIGN PATENT DOCUMENTS

CN 114270752 B * 7/2024 .......... H04W 72/232
WO 2021010742 A1 1/2021

OTHER PUBLICATIONS

3GPP TS 38.213 V16.8.0, 3rd Generation Partnership Project, Technical Specification Group Radio Access Network, NR, Physical layer procedures for control(Release 16), Dec. 2021, 189 pages.
(Continued)

*Primary Examiner* — Brandon M Renner
(74) *Attorney, Agent, or Firm* — Fish & Richardson P.C.

(57) ABSTRACT

A data transmission method includes: A receiver device receives N transport blocks TBs, where N is a positive integer; the receiver device obtains an upper limit of a quantity of transmissions of a feedback channel and a parameter of an interlace, and sends feedback information for M TBs in the N TBs through the interlace based on the parameter of the interlace and the upper limit of the quantity of transmissions, where M is a positive integer, M is less than or equal to N, M is less than or equal to a quantity upper limit P of feedback information sent by the receiver device, the quantity upper limit P is determined based on the tipper limit of the quantity of transmissions and the parameter of the interlace, P is a positive integer.

15 Claims, 22 Drawing Sheets

(56) References Cited

U.S. PATENT DOCUMENTS

| | | | | |
|---|---|---|---|---|
| 2019/0021088 | A1* | 1/2019 | Zhang | H04W 72/0453 |
| 2019/0059001 | A1* | 2/2019 | Yerramalli | H04W 16/14 |
| 2020/0404655 | A1* | 12/2020 | Salem | H04W 16/14 |
| 2021/0029731 | A1* | 1/2021 | Kundu | H04W 74/004 |
| 2021/0091901 | A1* | 3/2021 | Sun | H04W 72/1263 |
| 2022/0052795 | A1* | 2/2022 | Karaki | H04W 72/04 |
| 2022/0377813 | A1* | 11/2022 | Wang | H04L 1/1854 |
| 2024/0314842 | A1* | 9/2024 | Wang | H04L 1/1867 |
| 2026/0107304 | A1* | 4/2026 | Lee | H04W 56/001 |

OTHER PUBLICATIONS

Huawei et al., "Discussion on HARQ support for NR sidelink," 3GPP TSG-RAN WG2 #107bis, R2-1913701, Chongqing, China, Oct. 14-18, 2019, 17 pages.

OPPO, "Physical layer procedure for NR-V2X sidelink," 3GPP TSG RAN WG1 #98bis, RI-1910375, Chongqing, China, Oct. 14-20, 2019, 12 pages.

Extended European Search Report in European Appln. No. 22918452.8, mailed on Mar. 17, 2025, 13 pages.

* cited by examiner $$P = \left\lfloor \frac{L}{\left\lceil \frac{N_{PRB}^{bandwidth}}{GAP} \right\rceil} \right\rfloor = \left\lfloor \frac{12}{5} \right\rfloor = 2$$

$$P = \left\lfloor \frac{L}{\left\lfloor \frac{N_{PRB}^{bandwidth}}{GAP} \right\rfloor} \right\rfloor = \left\lfloor \frac{13}{4} \right\rfloor = 3$$

$$P = \left\lfloor \frac{L}{\left\lfloor \frac{N_{PRB}^{bandwidth}}{GAP} \right\rfloor} \right\rfloor = \left\lfloor \frac{13}{4} \right\rfloor = 3$$

$$P = \left\lceil \frac{L-2}{\left\lceil \frac{N_{PRB}^{bandwidth}}{GAP} \right\rceil} \right\rceil = \left\lceil \frac{12-2}{\left\lceil \frac{106}{25} \right\rceil} \right\rceil = 3$$

PRB — PRB that sends feedback information

PRB — PRB that does not send feedback information $$P = \left\lceil \frac{L-2}{\left\lfloor \frac{N_{PRB}^{bandwidth}}{GAP} \right\rfloor} \right\rceil = \left\lceil \frac{12-2}{\left\lfloor \frac{106}{25} \right\rfloor} \right\rceil = 3$$

$$P = \min\{N_{interlace}, \lfloor L/2 \rfloor\} = \min\{12, \lfloor 6/2 \rfloor\} = 3$$

DATA TRANSMISSION METHOD AND APPARATUS

CROSS-REFERENCE TO RELATED APPLICATIONS

This application is a continuation of International Application No. PCT/CN 2022/142457, filed on Dec. 27, 2022, which claims priorities to Chinese Patent Application No. 202210007015.5, filed on Jan. 5, 2022 and Chinese Patent Application No. 202210191913.0, filed on Feb. 28, 2022. All of the aforementioned patent applications are hereby incorporated by reference in their entireties.

TECHNICAL FIELD

This application relates to the field of communication technologies, and in particular, to a data transmission method and an apparatus.

BACKGROUND

Currently, for a transmitter device and a receiver device in communication, data transmission reliability may be improved by using a hybrid automatic repeat request HARQ) mechanism. For the receiver device, the receiver device receives data information from the transmitter device, and may feed back a decoding status of the data information to the transmitter device. The transmitter device determines, based on the decoding status of the receiver device, whether to retransmit the data information. The data information may be transmitted in a form of a transport block (TB). In some solutions, if the receiver device can successfully decode the data information (TB), the receiver device feeds back a HARQ acknowledgment (ACK) message to the transmitter device. The transmitter device may learn, based on the HARQ-ACK (which may be referred to as ACK for short), that the data information is successfully decoded, and not retransmit the data information. On the contrary, if the data information fails to be decoded, the receiver device feeds back a HARQ negative acknowledgment (NACK) message to the transmitter device. The transmitter device may learn, based on the HARQ-NACK (which may be referred to as NACK for short), that the data information fails to be decoded, and then retransmit the data information.

After a sidelink (SL) scenario is introduced, terminals may directly communicate with each other, and one terminal may simultaneously communicate with a plurality of terminals. If SL communication is performed by using an unlicensed spectrum, the receiver device usually needs to send an ACK or a NACK for a plurality of TBs. The plurality of TBs may be from a same transmitter device or different transmitter devices, and have a high requirement on data transmission performance. The conventional HARQ mechanism cannot meet a communication requirement in the SL scenario. Therefore, a HARQ mechanism applicable to the SL scenario urgently needs to be proposed, to improve performance of communication between terminals in the SL scenario.

SUMMARY

This application provides a data transmission method and an apparatus, to improve performance of communication between terminals in an SL scenario.

To achieve the foregoing objectives, embodiments of this application provide the following technical solutions.

According to a first aspect, a data transmission method is provided, and may be applied to an electronic device or an apparatus (for example, a chip system) that implements a function of an electronic device. The method includes:

a receiver device receives N transport blocks TBs, and the receiver device obtains an upper limit of a quantity of transmissions of a feedback channel and a parameter of an interlace, and sends feedback information for M TBs in the N TBs through the interlace based on the parameter of the interlace and the upper limit of the quantity of transmissions, where N is a positive integer, M is a positive integer, M is less than or equal to N, M is less than or equal to a quantity upper limit P of feedback information sent by the receiver device, the quantity upper limit P is determined based on the upper limit of the quantity of transmissions and the parameter of the interlace, and P is a positive integer.

In the data transmission method in this embodiment of this application, in one aspect, in some scenarios, the receiver device no longer provides a feedback for each received TB, so that signaling overheads in a HARQ process can be reduced. In the other aspect, a quantity of pieces of feedback information sent by the receiver device is less than or equal to the quantity upper limit P (P is determined based on the parameter of the interlace and the upper limit of the quantity of transmissions), so that the receiver device can transmit as much feedback information as possible when the upper limit of the quantity of transmissions and the parameter of the interlace are met, and therefore reliability of the HARQ process can be improved. In conclusion, data transmission performance can be improved.

The parameter of the interlace includes a gap between adjacent physical resource blocks PRBs in the interlace and/or a quantity of PRBs in the interlace.

In a possible design of the first aspect, the quantity upper limit P meets the following condition:

$$P=\left\lfloor\frac{L}{\left\lfloor\frac{N_{PRB}^{bandwidth}}{GAP}\right\rfloor}\right\rfloor,\text{ or }P=\left\lfloor\frac{L}{\left\lceil\frac{N_{PRB}^{bandwidth}}{GAP}\right\rceil}\right\rfloor,\text{ or }P=\left\lfloor\frac{L-1}{\left\lfloor\frac{N_{PRB}^{bandwidth}}{GAP}\right\rfloor}\right\rfloor+1,$$

$$\text{or }P=\left\lfloor\frac{L-1}{\left\lceil\frac{N_{PRB}^{bandwidth}}{GAP}\right\rceil}\right\rfloor+1,\text{ or }P=\left\lfloor\frac{L}{N_{PRB}^{interlace}}\right\rfloor,\text{ or }P=\left\lfloor\frac{L-1}{N_{PRB}^{interlace}}\right\rfloor+1.$$

L represents the upper limit of the quantity of transmissions, $$N_{PRB}^{bandwidth}$$

represents a quantity of PRBs in a bandwidth occupied by data transmission, GAP represents a gap between adjacent PRBs in the interlace, and $$N_{PRB}^{interlace}$$

represents the quantity of PRBs in the interlace.

In a possible design of the first aspect, the sending feedback information includes:

sending the feedback information through Q PRBs in a first interlace, where Q is a positive integer, $$Q = \left\lfloor \frac{N_{PRB}^{bandwidth}}{GAP} \right\rfloor \text{ or } Q = \left\lceil \frac{N_{PRB}^{bandwidth}}{GAP} \right\rceil,$$

and the interlace includes the first interlace.

In a possible design of the first aspect, when $$Q = \left\lfloor \frac{N_{PRB}^{bandwidth}}{GAP} \right\rfloor,$$

a PRB included in the first interlace is greater than Q.

For example, Q=4, and the first interlace includes five PRBs. In this case, the feedback information may be transmitted through four or five PRBs of the first interlace. If five PRBs in the first interlace are occupied, the feedback information may be repeatedly transmitted on more PRBs, to improve reliability of the feedback information. If four PRBs in the first interlace are occupied, more feedback information may be transmitted by reducing a quantity of repeat transmissions of each piece of feedback information.

In a possible design of the first aspect, if Q<X, the method further includes:

sending the feedback information through a PRB other than the Q PRBs in the first interlace, where X indicates a quantity of PRBs included in the first interlace.

In a possible design of the first aspect, the quantity upper limit P meets the following relationship:

$$P = \left\lceil \frac{L-2}{\left\lfloor \frac{N_{PRB}^{bandwidth}}{GAP} \right\rfloor} \right\rceil, \text{ or } P = \left\lceil \frac{L-2}{\left\lceil \frac{N_{PRB}^{bandwidth}}{GAP} \right\rceil} \right\rceil, \text{ or } P = \left\lceil \frac{L-2}{N_{PRB}^{interlace}} \right\rceil.$$

L represents the upper limit of the quantity of transmissions, $$N_{PRB}^{bandwidth}$$

represents a quantity of PRBs in a bandwidth occupied by data transmission, GAP represents a gap between adjacent PRBs in the interlace, and $$N_{PRB}^{interlace}$$

represents the quantity of PRBs in the interlace.

In a possible design of the first aspect, the sending feedback information includes:

sending the feedback information through R PRBs in a second interlace.

R is a positive integer, the R PRBs include at least a PRB with a highest frequency band and a PRB with a lowest frequency band in the second interlace, and the interlace includes the second interlace.

In this manner, the feedback information is transmitted through at least PRBs with the highest frequency band and the lowest frequency band of the interlace, to ensure that data transmission meets a bandwidth occupation requirement, and facilitate mutual detection between terminals when ensuring communication bandwidths of the terminals.

In a possible design of the first aspect, the quantity upper limit P meets the following relationship:

$$P = \min\{N_{interlace}, \lfloor L/2 \rfloor\}, \text{ or } P = \min\left\{N_{interlace}, \frac{[L-(L \bmod 2)]}{2}\right\}.$$

$N_{interlace}$ represents a quantity of interlaces available for the feedback channel, and L represents the upper limit of the quantity of transmissions.

In a possible design of the first aspect, the sending feedback information includes: sending the feedback information through a PRB with a highest frequency band and a PRB with a lowest frequency band in a first interlace.

In this manner, only the PRB with the highest frequency band and the PRB with the lowest frequency band of the interlace are used. On one aspect, an occupied channel bandwidth (OCB) requirement can be met, and on the other aspect, a quantity of times of repeatedly transmitting each piece of feedback information can be reduced, so that more feedback information can be sent.

In a possible design of the first aspect, a value range of M meets the following condition:

$$2^{M-1} \leq N_{CS}.$$

$N_{CS}$ represents a quantity upper limit of available sequence pairs of the feedback channel, and each sequence pair includes two sequences.

In this manner, the value range of M may be determined from a perspective of a resource, so that the receiver device determines, based on the value range of M, a quantity of pieces of feedback information that needs to be fed back.

In a possible design of the first aspect, the method further includes:

receiving indication information, where the indication information indicates an upper limit of M.

In a possible design of the first aspect, the indication information further indicates a time domain end position of the N TBs.

In a possible design of the first aspect, the sequence pair is determined based on M−1 pieces of feedback information corresponding to M−1 TBs in the M TBs, and the sequence pair is used to carry the feedback information of the M−1 TBs.

The sequence is determined based on feedback information other than the M−1 pieces of feedback information in M pieces of feedback information corresponding to the M TBs, the sequence is used to carry the feedback information other than the M−1 pieces of feedback information in the M pieces of feedback information, and the sequence pair includes the sequence.

In a possible design of the first aspect, a sequence is determined based on M pieces of feedback information corresponding to the M TBs, and the sequence is used to carry the M pieces of feedback information.

In a possible design of the first aspect, the sequence pair is determined based on the following formula:

$$(P_{ID} + M_{ID} + k') \bmod N_{CS}.$$

$P_{ID}$ represents a source identifier of a physical layer, $M_{ID}$ represents a parameter related to a spread type, k' is a parameter related to the M−1 pieces of feedback information in the M pieces of feedback information, $N_{CS}$ represents a quantity of available sequence pairs of the feedback channel, and mod represents a modulo operator.

In this manner, the sequence pair is determined based on the M−1 pieces of feedback information in the M pieces of feedback information, so that the sequence pair can represent, indicate, or carry the M−1 pieces of feedback information. The sequence is determined from the sequence pair based on one piece of feedback information, so that the determined sequence can carry or represent the one piece of feedback information. The receiver device sends the sequence to a transmitter device, so that the transmitter device can learn of the feedback information carried in the sequence.

In a possible design of the first aspect, the sequence is determined based on the following formula:

$$(P_{ID}+M_{ID}+k)\bmod R_{CS}^{set};\text{ and }R_{CS}^{set}=M_{PRB,set}^{PSFCH}*b.$$

$P_{ID}$ represents a source identifier of a physical layer, $M_{ID}$ represents a parameter related to a spread type, k is a parameter related to the M pieces of feedback information, $$R_{CS}^{set}$$

represents a quantity of available sequences of the feedback channel, $$M_{PRB,set}^{PSFCH}$$

represents a quantity of available PRBs of the feedback channel, and b is related to a quantity of sequences used in one PRB.

In a possible design of the first aspect, a quantity of TBs that fail to be decoded in the N TBs is S.

When S≥P, the M TBs are P TBs that fail to be decoded in the N TBs, and the feedback information corresponding to the M TBs is NACKs for the P TBs; or when S<P, the M TBs include the S TBs, and the feedback information corresponding to the M TBs includes NACKs for the S TBs.

In other words, when there are a large quantity of TBs that fail to be decoded (greater than the quantity upper limit P of the feedback information), the receiver device feeds back feedback information for the first P TBs that fail to be decoded at most. When a quantity of TBs that fail to be decoded is small (less than the quantity upper limit P of the feedback information), the receiver device may feed back NACKs for all TBs that fail to be decoded.

In a possible design of the first aspect, if all the N TBs are successfully decoded, the M TBs are a last TB in the N TBs, and the feedback information corresponding to the M TBs is an ACK for the last TB.

In this solution, NACKs are fed back as many as possible, to achieve effect of feeding back a decoding case in which there are more than P TBs. For example, in some examples, the receiver device sends only one NACK for TB #4 to the transmitter device, so that the transmitter device can learn of a decoding status of a plurality of remaining TBs by the receiver device, and signaling overheads in a transmission process are low. In other words, a large quantity of TBs decoding results (for example, carry decoding results of TB #1 to TB #8) can be carried by using small quantity of pieces of feedback information (for example, only feedback information of TB #4).

According to a second aspect, a data transmission method is provided, and may be applied to a transmitter device or an apparatus (for example, a chip system) that implements a function of a transmitter device. For example, the transmitter device performs the method, and the method includes: the transmitter device sends N transport blocks TBs, where N is a positive integer; and receives feedback information for M TBs in the N TBs through an interlace, where M is a positive integer, M is less than or equal to N, M is less than or equal to a quantity upper limit P of feedback information sent by the receiver device, the quantity upper limit P is determined based on an upper limit of a quantity of transmissions and a parameter of the interlace, and P is a positive integer.

In a possible design of the second aspect, the sending feedback information includes:

sending the feedback information through Q PRBs in a first interlace, where Q is a positive integer, $$Q=\left\lfloor\frac{N_{PRB}^{bandwidth}}{GAP}\right\rfloor\text{ or }Q=\left\lceil\frac{N_{PRB}^{bandwidth}}{GAP}\right\rceil,$$

and the interlace includes the first interlace.

In a possible design of the second aspect, if Q<X, the method further includes:

sending the feedback information through a PRB other than the Q PRBs in the first interlace, where X indicates a quantity of PRBs included in the first interlace.

In a possible design of the second aspect, the sending feedback information includes:

sending the feedback information through R PRBs in a second interlace.

R is a positive integer, the R PRBs include at least a PRB with a highest frequency band and a PRB with a lowest frequency band in the second interlace, and the interlace includes the second interlace.

In a possible design of the second aspect, the method further includes:

receiving indication information, where the indication information indicates an upper limit of M.

In the second aspect, for descriptions of other technical features, refer to related descriptions in the first aspect. For example, for a manner of calculating the quantity upper limit P, refer to related content in the first aspect.

According to a third aspect, a communication apparatus is provided, and the communication apparatus may be an electronic device or an apparatus (for example, a chip system) that implements a function of an electronic device, where the apparatus includes:

a communication interface, configured to receive N transport blocks TBs;

a processor, configured to obtain, by a receiver device, an upper limit of a quantity of transmissions of a feedback channel and a parameter of an interlace; and the communication interface, configured to send feedback information for M TBs in the N TBs through the interlace based on the parameter of the interlace and the upper limit of the quantity of transmissions.

N is a positive integer, M is a positive integer, M is less than or equal to N, M is less than or equal to a quantity upper limit P of feedback information sent by the receiver device, the quantity upper limit P is determined based on the upper limit of the quantity of transmissions and the parameter of the interlace, and P is a positive integer.

Optionally, the parameter of the interlace includes a gap between adjacent physical resource blocks PRBs in the interlace and/or a quantity of PRBs in the interlace.

In a possible design of the third aspect, the quantity upper limit P meets the following condition:

$$P=\left\lfloor\frac{L}{\left\lfloor\frac{N_{PRB}^{bandwidth}}{GAP}\right\rfloor}\right\rfloor,\text{ or }P=\left\lfloor\frac{L}{\left\lceil\frac{N_{PRB}^{bandwidth}}{GAP}\right\rceil}\right\rfloor,\text{ or }P=\left\lfloor\frac{L-1}{\left\lfloor\frac{N_{PRB}^{bandwidth}}{GAP}\right\rfloor}\right\rfloor+1,$$

$$\text{or }P=\left\lfloor\frac{L-1}{\left\lceil\frac{N_{PRB}^{bandwidth}}{GAP}\right\rceil}\right\rfloor+1,\text{ or }P=\left\lfloor\frac{L}{N_{PRB}^{interlace}}\right\rfloor,\text{ or }P=\left\lfloor\frac{L-1}{N_{PRB}^{interlace}}\right\rfloor+1.$$

L represents the upper limit of the quantity of transmissions, $$N_{PRB}^{bandwidth}$$

represents a quantity of PRBs in a bandwidth occupied by data transmission, GAP represents a gap between adjacent PRBs in the interlace, and $$N_{PRB}^{interlace}$$

represents the quantity of PRBs in the interlace.

In a possible design of the third aspect, the sending feedback information includes:

sending the feedback information through Q PRBs in a first interlace, where Q is a positive integer, $$Q=\left\lfloor\frac{N_{PRB}^{bandwidth}}{GAP}\right\rfloor\text{ or }Q=\left\lceil\frac{N_{PRB}^{bandwidth}}{GAP}\right\rceil,$$

and the interlace includes the first interlace.

In a possible design of the third aspect, when $$Q=\left\lfloor\frac{N_{PRB}^{bandwidth}}{GAP}\right\rfloor,$$

a PRB included in the first interlace is greater than Q.

In a possible design of the third aspect, the communication interface is further configured to: when Q<X, send the feedback information through a PRB other than the Q PRBs in the first interlace, where X indicates a quantity of PRBs included in the first interlace.

In a possible design of the third aspect, the quantity upper limit P meets the following relationship:

$$P=\left\lceil\frac{L-2}{\left\lfloor\frac{N_{PRB}^{bandwidth}}{GAP}\right\rfloor}\right\rceil,\text{ or }P=\left\lceil\frac{L-2}{\left\lceil\frac{N_{PRB}^{bandwidth}}{GAP}\right\rceil}\right\rceil,\text{ or }P=\left\lceil\frac{L-2}{N_{PRB}^{interlace}}\right\rceil.$$

L represents the upper limit of the quantity of transmissions, $$N_{PRB}^{bandwidth}$$

represents a quantity of PRBs in a bandwidth occupied by data transmission, GAP represents a gap between adjacent PRBs in the interlace, and $$N_{PRB}^{interlace}$$

represents the quantity of PRBs in the interlace.

In a possible design of the third aspect, the sending feedback information includes:

sending the feedback information through R PRBs in a second interlace.

R is a positive integer, the R PRBs include at least a PRB with a highest frequency band and a PRB with a lowest frequency band in the second interlace, and the interlace includes the second interlace.

In a possible design of the third aspect, the quantity upper limit P meets the following relationship:

$$P=\min\{N_{interlace},\lfloor L/2\rfloor\},\text{ or }P=\min\left\{N_{interlace},\frac{[L-(L\bmod 2)]}{2}\right\}.$$

$N_{interlace}$ represents a quantity of interlaces available for the feedback channel, and L represents the upper limit of the quantity of transmissions.

In a possible design of the third aspect, the sending feedback information includes: sending the feedback information through a PRB with a highest frequency band and a PRB with a lowest frequency band in a first interlace.

In a possible design of the third aspect, a value range of M meets the following condition:

$$2^{M-1}\le N_{CS}.$$

$N_{CS}$ represents a quantity upper limit of available sequence pairs of the feedback channel, and each sequence pair includes two sequences.

In a possible design of the third aspect, the communication interface is further configured to receive indication information, where the indication information indicates an upper limit of M.

In a possible design of the third aspect, the indication information further indicates a time domain end position of the N TBs.

In a possible design of the third aspect, the sequence pair is determined based on M−1 pieces of feedback information corresponding to M−1 TBs in the M TBs, and the sequence pair is used to carry the feedback information of the M−1 TBs.

The sequence is determined based on feedback information other than the M−1 pieces of feedback information in M pieces of feedback information corresponding to the M TBs, the sequence is used to carry the feedback information other than the M−1 pieces of feedback information in the M pieces of feedback information, and the sequence pair includes the sequence.

In a possible design of the third aspect, a sequence is determined based on M pieces of feedback information corresponding to the M TBs, and the sequence is used to carry the M pieces of feedback information.

In a possible design of the third aspect, the sequence pair is determined based on the following formula:

$$(P_{ID}+M_{ID}+k')\bmod N_{CS}.$$

$P_{ID}$ represents a source identifier of a physical layer, $M_{ID}$ represents a parameter related to a spread type, k' is a parameter related to the M−1 pieces of feedback information in the M pieces of feedback information, $N_{CS}$ represents a quantity of available sequence pairs of the feedback channel, and mod represents a modulo operator.

In a possible design of the third aspect, the sequence is determined based on the following formula:

$$(P_{ID}+M_{ID}+k)\bmod R_{CS}^{set};\text{ and } R_{CS}^{set}=M_{PRB,set}^{PSFCH}*b.$$

$P_{ID}$ represents a source identifier of a physical layer, $M_{ID}$ represents a parameter related to a spread type, k is a parameter related to the M pieces of feedback information, $$R_{CS}^{set}$$

represents a quantity of available sequences of the feedback channel, $$M_{PRB,set}^{PSFCH}$$

represents a quantity of available PRBs of the feedback channel, and b is related to a quantity of sequences used in one PRB.

In a possible design of the third aspect, a quantity of TBs that fail to be decoded in the N TBs is S.

When S≥P, the M TBs are P TBs that fail to be decoded in the N TBs, and the feedback information corresponding to the M TBs is NACKs for the P TBs; or when S<P, the M TBs include the S TBs, and the feedback information corresponding to the M TBs includes NACKs for the S TBs.

In a possible design of the third aspect, if all the N TBs are successfully decoded, the M TBs are a last TB in the N TBs, and the feedback information corresponding to the M TBs is an ACK for the last TB.

According to a fourth aspect, a communication apparatus is provided, and the communication apparatus may be a transmitter device or an apparatus (for example, a chip system) that implements a function of a transmitter device, where the apparatus includes:

a communication interface, configured to: send N transport blocks TBs, and receive feedback information for M TBs in the N TBs through an interlace.

N is a positive integer, M is a positive integer, M is less than or equal to N, M is less than or equal to a quantity upper limit P of feedback information sent by the receiver device, the quantity upper limit P is determined based on the upper limit of the quantity of transmissions and the parameter of the interlace, and P is a positive integer.

In a possible design of the fourth aspect, the sending feedback information includes:

sending the feedback information through Q PRBs in a first interlace, where Q is a positive integer, $$Q=\left\lfloor\frac{N_{PRB}^{bandwidth}}{GAP}\right\rfloor\text{ or }Q=\left\lceil\frac{N_{PRB}^{bandwidth}}{GAP}\right\rceil,$$

and the interlace includes the first interlace.

In a possible design of the fourth aspect, the communication interface is further configured to: when Q<X, send the feedback information through a PRB other than the Q PRBs in the first interlace, where X indicates a quantity of PRBs included in the first interlace.

In a possible design of the fourth aspect, the sending feedback information includes:

sending the feedback information through R PRBs in a second interlace.

R is a positive integer, the R PRBs include at least a PRB with a highest frequency band and a PRB with a lowest frequency band in the second interlace, and the interlace includes the second interlace.

In a possible design of the fourth aspect, the communication interface is further configured to receive indication information, where the indication information indicates an upper limit of M.

In the fourth aspect, for descriptions of other technical features, refer to related descriptions in the third aspect. For example, for a manner of calculating the quantity upper limit P, refer to related content in the third aspect.

According to a fifth aspect, an embodiment of this application provides a communication apparatus. The apparatus has a function of implementing the data transmission method in any possible design of any one of the foregoing aspects. The function may be implemented by hardware, or may be implemented by hardware executing corresponding software. The hardware or the software includes one or more modules corresponding to the function.

According to a sixth aspect, a communication apparatus is provided, including: a processor and a memory. The memory is configured to store computer-executable instructions, and when the communication apparatus runs, the processor executes the computer-executable instructions stored in the memory, so that the communication apparatus performs the data transmission method in any one of the foregoing aspects.

According to a seventh aspect, a communication apparatus is provided, including a processor. After the processor is coupled to a memory and reads instructions in the memory, the processor is configured to perform the data transmission method in any one of the foregoing aspects according to the instructions.

According to an eighth aspect, a computer-readable storage medium is provided. The computer-readable storage medium stores instructions. When the instructions are run on a computer, the computer is enabled to perform the data transmission method in any one of the foregoing aspects.

According to a ninth aspect, a computer program product including instructions is provided. When the computer program product runs on a computer, the computer is enabled to perform the data transmission method in any one of the foregoing aspects.

According to a tenth aspect, a circuit system is provided. The circuit system includes a processing circuit. The processing circuit is configured to perform the data transmission method in any one of the foregoing aspects.

According to an eleventh aspect, a chip is provided. The chip includes a processor. The processor is coupled to a memory, and the memory stores program instructions. When the program instructions stored in the memory are executed by the processor, the data transmission method in any possible design of any one of the foregoing aspects is implemented.

According to a twelfth aspect, a communication system is provided. The communication system includes the transmitter device in any one of the foregoing aspects and the receiver device in any one of the foregoing aspects.

For technical effects brought by any design manner of the second aspect to the twelfth aspect, refer to technical effects brought by different design manners of the first aspect. Details are not described herein again.

BRIEF DESCRIPTION OF DRAWINGS

FIG. 5 is a diagram of a structure of a communication device according to an embodiment of this application;

DESCRIPTION OF EMBODIMENTS

Figure 1:
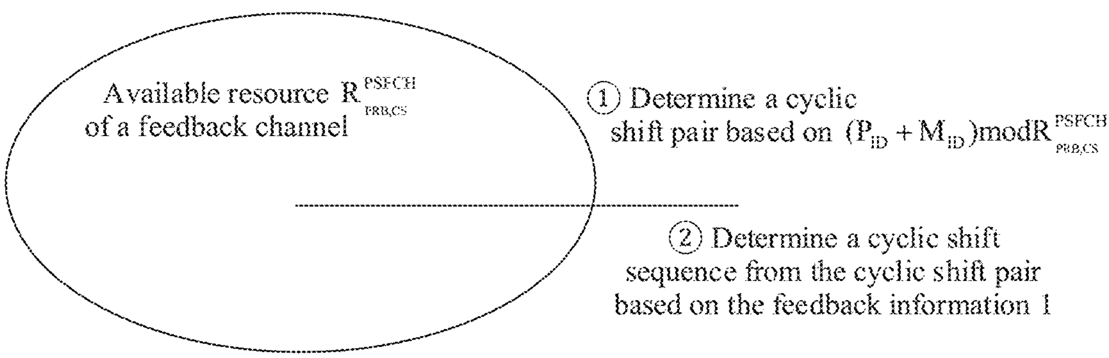
FIG. 1 is a diagram of a method for determining a cyclic shift sequence in a conventional technology.

Terms used in the following embodiments are merely intended to describe specific embodiments, but are not intended to limit this application. As used in the specification of this application and the appended claims, the singular expression "a", "an", "the", "the foregoing", "such a", or "this" is intended to also include an expression "one or more" unless otherwise clearly indicated in the context. It should be further understood that, in the following embodiments of this application, "at least one" and "one or more" mean one or more (including two). The term "and/or" is used for describing an association relationship between associated objects, and indicates that three relationships may exist. For example, A and/or B may represent: Only A exists, both A and B exist, and only B exists, where A and B may be singular or plural. The character "/" generally indicates an "or" relationship between the associated objects.

Reference to "an embodiment", "some embodiments", or the like described in the specification indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise emphasized in another manner. The terms "include", "have", and their variants all mean "include but are not limited to", unless otherwise emphasized in another manner. The term "connection" includes direct connection and indirect connection, unless otherwise specified.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features.

In embodiments of this application, the term "example", "for example", or the like is used to give an example, an illustration, or a description. Any embodiment or design scheme described as an "example" or "for example" in embodiments of this application should not be construed as being more advantageous than another embodiment or design scheme. Exactly, use of the term "example", "for example", or the like is intended to present a related concept in a specific manner.

The following describes some technical terms in embodiments of this application.

1. Sidelink (SL)

In some scenarios, sidelink communication may be performed between terminals, that is, direct communication may be performed between the terminals without forwarding by a base station. In this case, a link directly connected between the terminals is referred to as the SL.

A physical sidelink control channel (PSCCH) is used to carry sidelink control information (SCI). The SCI may be used to indicate at least one type of information such as a coding modulation format, a time-frequency resource, resource reservation information, a retransmission indication, a terminal source address, a terminal destination address, and hybrid automatic repeat request (HARQ) information of sidelink data information. A receiver device in the sidelink communication receives and parses the SCI on the PSCCH, and then receives and parses the sidelink data information based on the parsed SCI.

A physical sidelink shared channel (PSSCH) is used to carry the sidelink data information, where the sidelink data information is service data information in the sidelink communication.

An SL scenario includes but is not limited to a scenario like vehicle-to-everything (V2X), vehicle-to-vehicle (V2V), device-to-device (D2D).

2. SL Resource Pool

In a new radio (NR) SL, a terminal may perform transmission based on a resource pool. The resource pool is a logical concept. One resource pool may include a plurality of physical resources, and any physical resource in the resource pool may be used to transmit data. When performing data transmission, the terminal needs to select a resource from the resource pool. The resource selection may be that the terminal selects a resource from the resource pool based on indication information of a network device, and performs data transmission by using the resource, or the terminal may independently select a resource from the resource pool, and perform data transmission by using the resource.

In some examples, each resource pool includes one or more subchannels. Optionally, in a resource pool, a quantity of frequency domain resources occupied by each subchannel, for example, physical resource blocks (PRBs), is the same. Frequency domain resources occupied by each subchannel that belong to different resource pools may be different. It should be noted that the quantity of frequency domain resources occupied by each subchannel is not limited in this embodiment of this application.

3. SL Unlicensed Spectrum (SL-U)

As an important topic in the R18 standard, main content of the SL-U is to perform SL transmission by using an unlicensed spectrum.

Generally, terminals need to detect whether each other exists during communication. If a terminal has a low communication bandwidth, it is difficult for another terminal to identify the terminal. In addition, the low communication bandwidth of the terminal also affects transmission efficiency of the terminal. Based on this reason, some rules need to be followed when the unlicensed spectrum is used. For example, in a bandwidth with a granularity of 20 MHz, at least 80% of a spectrum in the bandwidth is occupied, to increase a communication bandwidth, facilitate mutual identification between terminals, and help improve transmission efficiency of the terminals.

4. NR Unlicensed Spectrum (SL-U)

In an NR-U technology, the unlicensed spectrum may be used for NR transmission. In some solutions, an interlace is used for transmission. Each interlace may include a plurality of PRBs. The terminal may transmit data on a part or all PRBs in the plurality of PRBs.

5. Physical Sidelink Feedback Channel (PSFCH)

5.1 in Some Solutions, an ACK or a NACK May be Carried Through the PSFCH.

Currently, the foregoing HARQ feedback process is supported in a unicast scenario and a multicast scenario. In the unicast scenario, if a received TB is successfully decoded, the receiver device feeds back the ACK to the transmitter device; or if decoding fails, the receiver device feeds back the NACK.

In the multicast scenario, the receiver device determines, based on parameters such as a distance between the receiver device (RX UE) and the transmitter device (TX UE) and/or reference signal received power (RSRP), whether to send a HARQ feedback. In the multicast scenario, HARQ feedback has the following two options.

Option 1: If the TB fails to be decoded, the NACK is fed back. In other cases, no signal is transmitted. In the option 1, all receiver devices in a group are allowed to share PSFCH resources.

Option 2: If the TB is successfully decoded, the receiver device feeds back the ACK; or if the TB fails to be decoded, the receiver device feeds back the NACK. In the option 2, each receiver device is allowed to use a separate PSFCH resource.

Optionally, a PSFCH of at least one symbol is supported in the unicast and the option 1 and the option 2 in the multicast, and the PSFCH channel may multiplex sequence bearer information of a physical uplink control channel (PUCCH) in a format 0.

5.2 Periodicity of the PSFCH

In the resource pool, resources of the PSFCH appear periodically, and a value of the periodicity includes but is not limited to 1, 2, and 4 slots. A PSSCH received by a terminal in a time period needs to be fed back on a PSFCH in a corresponding periodicity.

For example, for a PSSCH that appears in a slot n, a PSFCH corresponding to the PSSCH appears in a slot n+a. a is a minimum integer greater than or equal to a parameter K. Optionally, the parameter K is related to a processing delay. If K of all terminals is a same value, when the resources of the PSFCH appear in a periodicity T1, PSFCH resources corresponding to PSSCHs in T1 slots are in one slot.

6. Cyclic Shift Pair (CS Pair), Cyclic Shift Sequence

In some examples, the ACK or the NACK may be carried by using the cyclic shift sequence.

In some solutions, the terminal may determine, in the following manner, a cyclic shift sequence used to send the PSFCH.

The terminal may determine a group of resource blocks (RBs), namely, $$M_{PRB,set}^{PSFCH},$$

based on configuration information sl-PSFCH-RB-Set.

$$\left[\left(i + j * N_{PSSCH}^{PSFCH}\right) * M_{subch,slot}^{PSFCH}, \left(i + 1 + j * N_{PSSCH}^{PSFCH}\right) * M_{subch,slot}^{PSFCH} - 1\right]$$

is divided by the terminal from $$M_{PRB,set}^{PSFCH},$$

and is used for a $j^{th}$ subchannel in $N_{subch}$ subchannels in an $i^{th}$ slot.

$$M_{subch,slot}^{PSFCH} = M_{PRB,set}^{PSFCH} / \left(N_{subch} \cdot N_{PSSCH}^{PSFCH}\right), 0 \le i < N_{PSSCH}^{PSFCH} 0 \le j < N_{subch}$$

A PRB division sequence starts from a descending order of i, and is determined in a descending order of j after the PRB division ends. For the $i^{th}$ slot, the PSFCH may occupy two consecutive symbols in the $i^{th}$ Slot.

The terminal determines that a resource set of the PSFCH is $$R_{PRB,CS}^{PSFCH} = N_{type}^{PSFCH} * M_{subch,slot}^{PSFCH} * N_{CS}^{PSFCH} \cdot N_{CS}^{PSFCH}$$

is a quantity of cyclic shift pairs, and is determined by configuration information sl-NumMuxCS-Pair. There are two possibilities of a value of $$N_{type}^{PSFCH}.$$

One possibility is that the value is 1, that is, the resource of the PSFCH corresponds to a start subchannel of the PSSCH. For the other value $$M_{subch}^{PSSCH},$$

in this case, $$N_{subch}^{PSSCH}, M_{subch,slot}^{PSFCH}$$

is a PRB occupied by the PSSCH.

Next, as shown in ① in FIG. 1, the terminal determines, according to $(P_{ID}+M_{ID})$ $$\text{mod} R_{PRB,CS}^{PSFCH},$$

a cyclic shift pair used to send the PSFCH. $P_{ID}$ is a source ID of a physical layer, and may be determined by SCI carried by the PSSCH and $M_{ID}$ is determined by a spread type. One cyclic shift pair includes two cyclic shift sequences.

Then, as shown in ② in FIG. 1, the terminal determines, from the cyclic shift pair based on a decoding result, a cyclic shift sequence used to send the PSFCH. For example, if the decoding result is that decoding fails, a cyclic shift sequence (for example, corresponding to 1) corresponding to the decoding failure is determined from the cyclic shift pair. Alternatively, if the decoding result is that the decoding succeeds, a cyclic shift sequence (for example, corresponding to 0) corresponding to the successful decoding is determined from the cyclic shift pair.

7. Channel Busy Ratio (CBR)

The CBR is used to describe a channel busy degree. In LTE V2X and R16 V2X, a CBR value needs to be determined during PSSCH transmission, to measure communication quality of a channel on which the terminal is located. If the CBR is high, it means that a channel on which the current resource pool is located is very busy, for example, most subchannels are occupied. In this case, the terminal may transmit the PSSCH when the CBR decreases, or the terminal sends the PSSCH by using another resource pool, to avoid a resource conflict.

Figure 2:
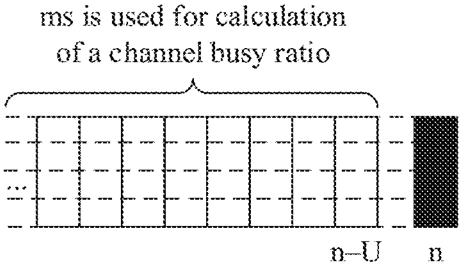
FIG. 2 is a diagram of a method for determining a channel busy ratio in a conventional technology.

Optionally, the CBR may be defined as a ratio of subchannels whose received signal strength indicator (RSSI) exceeds a threshold starting from a $2^{nd}$ symbol in a slot within 100 ms. For example, a specific calculation manner of the CBR is shown in FIG. 2. When the terminal prepares to perform transmission on a resource 1 at a moment n, the terminal needs to calculate the CBR at a moment n-U. RSSI values of each subchannel within 100 ms before the moment n-U are used as sensing results, and the sensing results are used to calculate the CBR. For example, a time range is 100 ms, and a frequency range is four subchannels. If an RSSI of each subchannel is calculated once every 1 ms, four RSSIs need to be calculated for the four subchannels within every 1 ms. Therefore, 400 RSSIs need to be calculated for the four subchannels within 100 ms. A ratio of a quantity of RSSIs higher than the RSSI threshold to 400 is the CBR. The definition of U is related to the processing delay of the terminal.

8. Access Mode of the Unlicensed Spectrum

The access mode of the unlicensed spectrum includes frame-based equipment (FBE) access and listen before talk (LBT) access. The FBE access means that channel idle detection is performed before each slot starts, and access is performed when it is determined that a channel is idle. The LBT access means that channel detection and access are performed at any time when there is a transmission requirement.

In the foregoing CBR calculation solution, a channel detection manner starting from the $2^{nd}$ symbol is based on the FBE access. The purpose is to measure resource occupation of devices in a same system in the resource pool.

In a conventional HARQ mechanism, the receiver device needs to separately send feedback information for each received TB. Consequently, signaling overheads are large, and a communication requirement in an SL scenario is not met. To resolve the foregoing technical problem, an embodiment of this application provides a data transmission method. The communication method may be applied to the SL scenario, including a scenario in which various terminal devices directly communicate with each other, for example, including but not limited to V2X, D2D communication, and V2V communication. The following mainly uses application in V2X as an example, but this does not constitute a limitation on an application scenario of embodiments of this application.

Optionally, a spectrum used in the SL scenario includes but is not limited to the unlicensed spectrum, and the unlicensed spectrum includes a frequency band near 2.4 GHz, a frequency band near 5.8 GHz, and the like.

Figure 3:
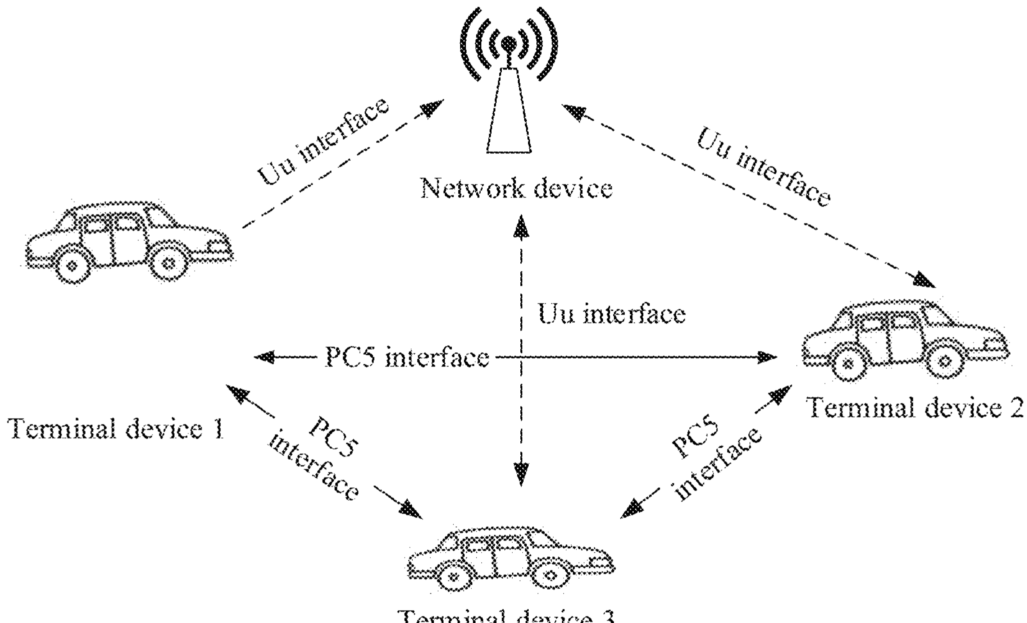
FIG. 3 is a diagram of an architecture of a communication system according to an embodiment of this application.

FIG. 3 is a V2X communication system according to an embodiment of this application. As shown in FIG. 3, the V2X communication system may include a plurality of terminal devices (a terminal device 1, a terminal device 2, a terminal device 3, . . . , and the like shown in FIG. 3). A direct communication link may be established between a terminal device and a surrounding terminal device, to implement direct communication. For example, the terminal device 1 may directly communicate with the terminal device 2. For example, a direct communication link established between terminal devices may be defined as an SL, and an interface for direct communication between the terminal device and a surrounding terminal device may be referred to as a PC5 interface.

Optionally, the V2X communication system shown in FIG. 3 may further include a network device. The terminal device may send a V2X message to a peer terminal device in a network device forwarding manner, or access a network through the network device. For example, the terminal device 1 may send the V2X message to the network device, and the network device sends the V2X message to the terminal device 2. For example, an interface between the terminal device and the network device may be referred to as a Uu interface.

Optionally, the network architecture shown in FIG. 3 is merely an example of an architecture diagram. A quantity of network elements included in the V2X communication system shown in FIG. 3 is not limited in this embodiment of this application. Moreover, in addition to the network function entities shown in FIG. 3, the network shown in FIG. 3 may further include other function entities, for example, an application server and a core network device, although the other function entities are not shown. This is not limited.

The network device in FIG. 3 is mainly configured to implement functions such as a radio physical control function, resource scheduling and radio resource management, radio access control, and mobility management. The network device may be an access network (AN) device/a radio access network (RAN) device, or may be a device including a plurality of 5G-AN/5G-RAN nodes, or may be a NodeB (NB), an evolved NodeB (eNB), a next generation NodeB (gNB), a transmission reception point (TRP), a transmission point (TP), or any node in other access nodes of a specific type. In this embodiment of this application, an apparatus configured to implement a function of the network device may be the network device, or may be an apparatus that can support the network device in implementing the function, for example, a chip system. In the technical solutions provided in embodiments of this application, an example in which the apparatus configured to implement the function of the network device is the network device is used for describing the technical solutions provided in embodiments of this application.

The terminal device is a terminal that accesses the V2X communication system and that has the wireless transceiver function, or a chip that can be disposed in the terminal. For example, the terminal device may be a vehicle shown in FIG. 3. The vehicle is not limited to any type of vehicles, such as a vehicle, a bicycle, an electric vehicle, an airplane, a ship, a train, or a high-speed railway. The vehicle may include a vehicle-mounted device that can directly communicate with another device. The vehicle-mounted device may be referred to as user equipment (UE) or a terminal device.

The terminal device may also be referred to as a user apparatus, an access terminal, a subscriber unit, a subscriber station, a mobile station, a remote station, a remote terminal, a mobile device, a user terminal, a terminal, a wireless communication device, a user agent or a user apparatus. For example, the terminal device in embodiments of this application may be a mobile phone, a tablet computer (pad), a computer having a wireless transceiver function, a virtual reality (VR) terminal device, an augmented reality (AR) terminal device, a wireless terminal in vehicle user equipment (VUE), and industrial control, a wireless terminal in self driving, a wireless terminal in remote medical, a wireless terminal in a smart grid, a wireless terminal in transportation safety, a wireless terminal in a smart city, a wireless terminal in a smart home, a vehicle-mounted device, an RSU having a terminal function, and the like. The terminal device in this application may alternatively be a vehicle-mounted module, a vehicle-mounted assembly, a vehicle-mounted component, a vehicle-mounted chip, or a vehicle-mounted unit that is built in a vehicle as one or more components or units. The vehicle may implement the communication method in this application by using the vehicle-mounted module, the vehicle-mounted assembly, the vehicle-mounted component, the vehicle-mounted chip, or the vehicle-mounted unit that is built in the vehicle.

Figure 4:
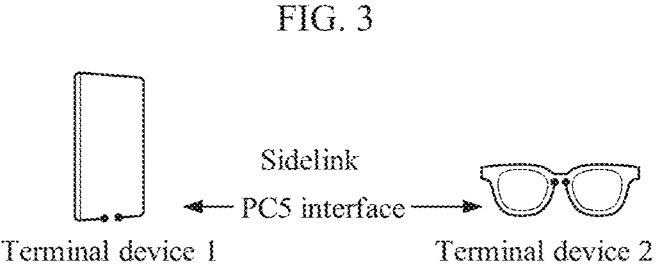
FIG. 4 is a diagram of another architecture of a communication system according to an embodiment of this application.

FIG. 4 is another example of an SL scenario to which an embodiment of this application is applicable. A mobile phone and smart glasses may communicate with each other according to the data transmission method provided in this embodiment of this application.

In this embodiment of this application, an apparatus configured to implement a function of a terminal device may be the terminal device, or may be an apparatus that supports a terminal device in implementing the function, for example, a chip system. In this embodiment of this application, the chip system may include a chip, or may include a chip and another discrete component.

A system architecture and a service scenario described in this application are intended to describe the technical solutions of this application more clearly, and do not constitute a unique limitation to the technical solutions provided in this application. A person of ordinary skill in the art may know that, with evolution of a system architecture and emergence of a new service scenario, the technical solutions provided in this application are also applicable to similar technical problems.

Optionally, the terminal device or the network device in embodiments of this application may be implemented through a communication device having a structure described in FIG. 5. FIG. 5 is a diagram of a hardware structure of a communication device according to an embodiment of this application. The communication device 400 includes at least one processor 401, a memory 403, and at least one communication interface 404. The memory 403 may alternatively be included in the processor 401.

The processor 401 may include one or more processing units. The processing unit may be a central processing unit (CPU), an application-specific integrated circuit (ASIC), or one or more integrated circuits configured to control program execution of the solutions of this application.

A communication line exists between the foregoing components, and is configured to transmit information between the components.

The communication interface 404 is configured to communicate with another device. In this embodiment of this application, the communication interface may be a module, a circuit, an interface, or another apparatus that can implement a communication function, and is configured to communicate with another device. Optionally, the communication interface may be a transmitter that is independently disposed, and the transmitter may be configured to send information to the another device; or the communication interface may be a receiver that is independently disposed, and is configured to receive information from the another device. Alternatively, the communication interface may be a component integrating functions of sending and receiving information. A specific implementation of the communication interface is not limited in this embodiment of this application.

The memory 403 may be a read-only memory (ROM) or another type of storage module that can store static information and instructions, a random access memory (RAM) or another type of storage module that can dynamically store information and instructions, or may be an electrically erasable programmable read-only memory (EEPROM), an optical disc, a magnetic disk, or another magnetic storage device. The memory may independently exist and may be connected to the processor through a communication line. The memory may alternatively be integrated with the processor.

The memory 403 is configured to store computer-executable instructions. The computer-executable instructions may be invoked by one or more processing units in the processor 401 to perform corresponding steps in the methods provided in the following embodiments.

Optionally, the computer-executable instruction in this embodiment of this application may also be referred to as application program code, an instruction, a computer program, or another name. This is not limited in this embodiment of this application.

In specific implementation, in an embodiment, the communication device 400 may include a plurality of processors, for example, the processor 401 and a processor 407 in FIG. 5. Each of the processors may be a single-core processor, or may be a multi-core processor. The processor herein may be one or more devices, circuits, and/or processing cores configured to process data (for example, computer program instructions).

In specific implementation, in an embodiment, if the communication device 400 is a terminal like a mobile phone, the communication device 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, or a projector. The input device 406 communicates with the processor 401, and may receive an input of a user in a plurality of manners. For example, the input device 406 may be a mouse, a keyboard, a touchscreen device, or a sensor device.

FIG. 5 is an example diagram of a structure of the communication device. It should be understood that the communication device shown in the figure is merely an example, and during actual application, the communication device may have more or fewer components than those shown in FIG. 5, or two or more components may be combined, or the communication device may have different component configurations.

The communication device 400 may be a general-purpose device or a dedicated device. A type of the communication device 400 is not limited in embodiments of this application. The terminal device may be a device having a structure similar to that in FIG. 5.

The following describes the communication method provided in embodiments of this application with reference to the accompanying drawings.

It should be noted that embodiments of this application are mainly applied to an SL scenario, that is, a procedure in which terminal devices communicate with each other through a PC5 interface.

Embodiment 1

Figure 6:
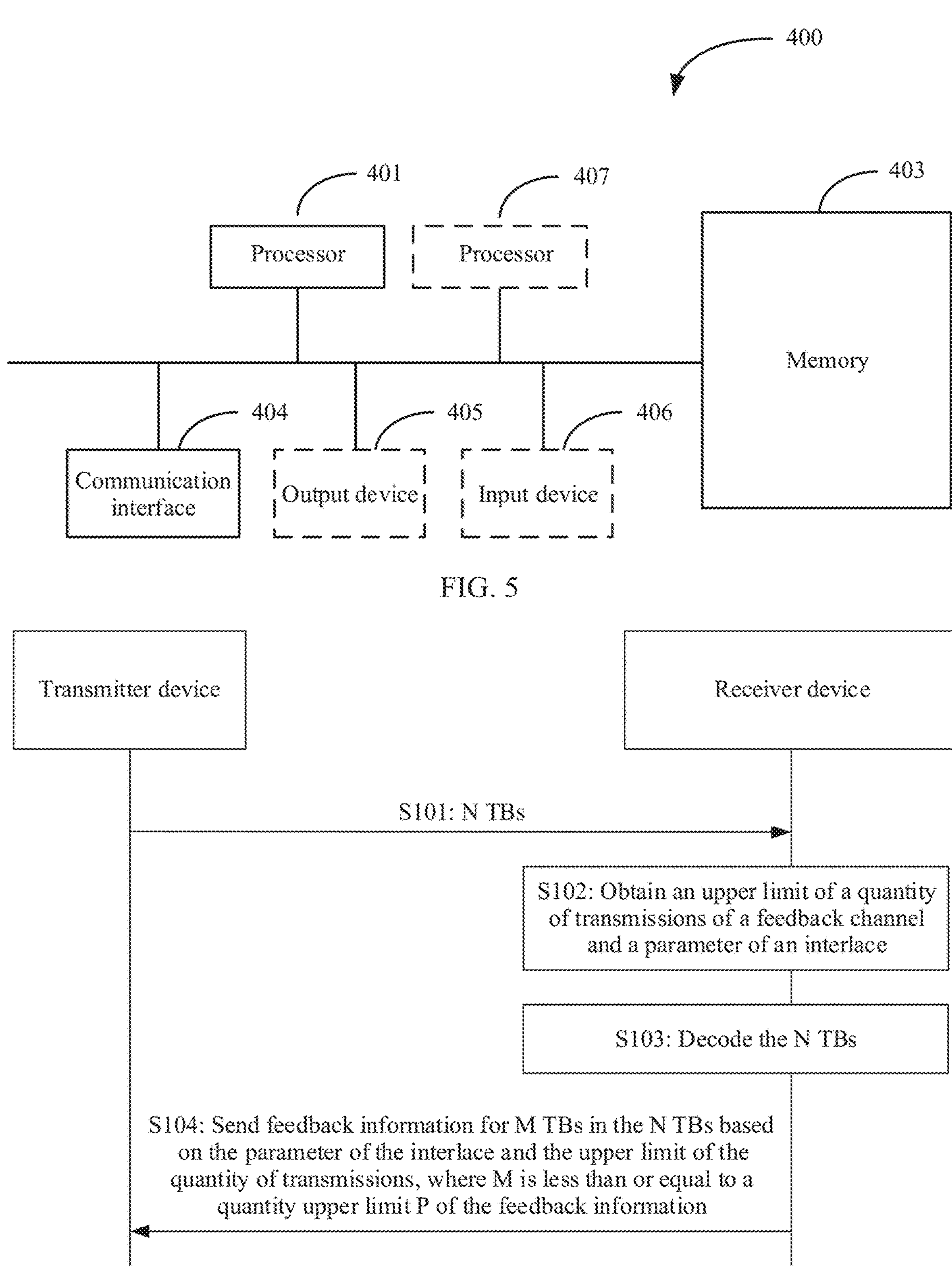
FIG. 6 is a schematic flowchart of a data transmission method according to an embodiment of this application.

Refer to FIG. 6. A communication method provided in an embodiment of this application includes the following steps.

S101: A transmitter device sends N TBs to a receiver device. Correspondingly, the receiver device receives the N TBs from the transmitter device, where N is a positive integer.

S102: The receiver device obtains an upper limit of a quantity of transmissions of a feedback channel and a parameter of an interlace.

For example, the feedback channel may be a PSFCH. Optionally, the parameter of the interlace includes a gap between adjacent PRBs in the interlace and/or a quantity of PRBs in the interlace.

Figure 7:
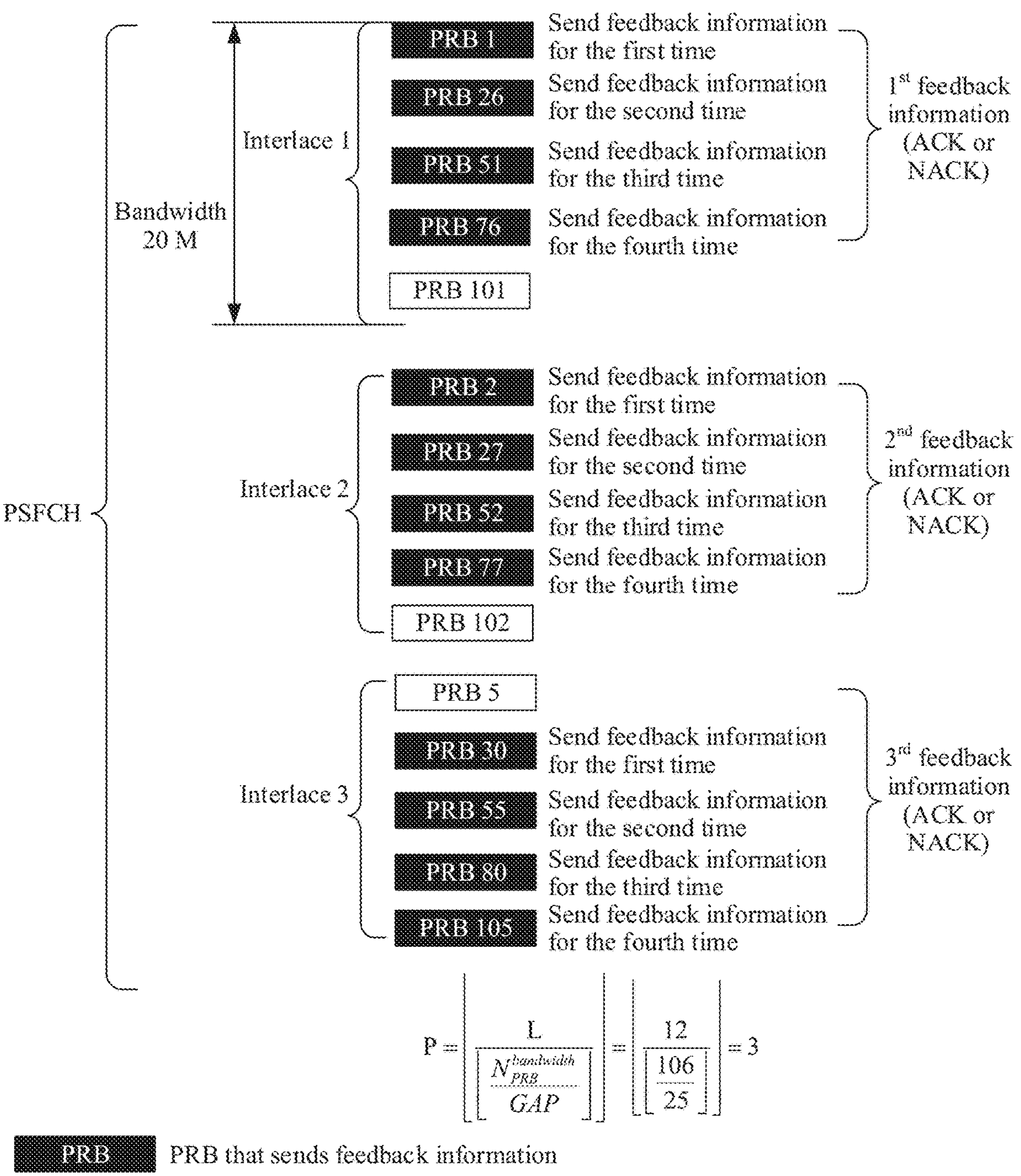
FIG. 7 to FIG. 12 are diagrams of a method for transmitting data through an interlace according to an embodiment of this application.

A gap between adjacent PRBs in the interlace is a quantity of PRBs between the adjacent PRBs. For example, as shown in FIG. 7, the quantity of PRBs between the adjacent PRBs (for example, a PRB 1 and a PRB 26) in the interlace is 25. The gap between the PRBs is set to occupy 80% of a frequency band in the interlace when as few PRBs as possible are occupied.

In a possible implementation, the upper limit of the quantity of transmissions may depend on a capability of the receiver device, or may be configured by a network device (for example, a base station) for the receiver device, or the upper limit of the quantity of transmissions is a parameter preconfigured in the receiver device.

Optionally, the upper limit of the quantity of transmissions may be determined by using a psfch-FormatZeroSidelink parameter. A value of the upper limit of the quantity of transmissions includes but is not limited to 4, 8, and 16.

Optionally, an execution sequence of S102 and S101 is not limited in this embodiment of this application.

In this embodiment of this application, after obtaining the upper limit of the quantity of transmissions and the parameter of the interlace, the receiver device may determine, based on the upper limit of the quantity of transmissions and the parameter of the interlace, a quantity upper limit P for sending feedback information, and P is a positive integer. For example, the feedback information is feedback information of the receiver device for M TBs in the N TBs. M is a positive integer, M is less than or equal to N, and M is less than or equal to the quantity upper limit P of the feedback information sent by the receiver device.

The following describes, in several cases, a manner of calculating the quantity upper limit P of the feedback information sent by the receiver device.

Case 1: The quantity upper limit P meets the following condition:

$$P=\left\lfloor\frac{L}{\left\lfloor\frac{N_{PRB}^{bandwidth}}{GAP}\right\rfloor}\right\rfloor,\text{ or }P=\left\lfloor\frac{L}{\left\lceil\frac{N_{PRB}^{bandwidth}}{GAP}\right\rceil}\right\rfloor,\text{ or }P=\left\lfloor\frac{L-1}{\left\lfloor\frac{N_{PRB}^{bandwidth}}{GAP}\right\rfloor}\right\rfloor+1,$$

$$\text{or }P=\left\lfloor\frac{L-1}{\left\lceil\frac{N_{PRB}^{bandwidth}}{GAP}\right\rceil}\right\rfloor+1,\text{ or }P=\left\lfloor\frac{L}{N_{PRB}^{interlace}}\right\rfloor,\text{ or }P=\left\lceil\frac{L}{N_{PRB}^{interlace}}\right\rceil.$$

L represents the upper limit of the quantity of transmissions, $$N_{PRB}^{bandwidth}$$

represents a quantity of PRBs in a bandwidth occupied by data transmission, and GAP represents a gap between adjacent PRBs in one interlace. The quantity of transmissions indicates a quantity of times of sending of a cyclic shift sequence supported by the receiver device at a same moment. The bandwidth occupied by data transmission may also be referred to as a communication bandwidth. $\lfloor a\rfloor$ indicates rounding down, and $\lceil a\rceil$ indicates rounding up.

$$N_{PRB}^{interlace}$$

indicates a quantity of PRBs included in one interlace. Optionally, $$N_{PRB}^{interlace}=\left\lfloor\frac{N_{PRB}^{bandwidth}}{GAP}\right\rfloor;\text{ or }N_{PRB}^{interlace}=\left\lceil\frac{N_{PRB}^{bandwidth}}{GAP}\right\rceil,$$

or the quantity of PRBs included in one interlace may be a preconfigured value, for example, 2.

Case 2: The quantity upper limit P meets the following relationship: P=

$$\left\lceil\frac{L-2}{\left\lfloor\frac{N_{PRB}^{bandwidth}}{GAP}\right\rfloor}\right\rceil,\ P=\left\lceil\frac{L-2}{\left\lceil\frac{N_{PRB}^{bandwidth}}{GAP}\right\rceil}\right\rceil,\text{ or }P=\left\lceil\frac{L-2}{N_{PRB}^{interlace}}\right\rceil,$$

where L represents the upper limit of the quantity of transmissions, $$N_{PRB}^{bandwidth}$$

represents a quantity of PRBs in a bandwidth occupied by data transmission, GAP represents a gap between adjacent PRBs in the interlace, and $$N_{PRB}^{interlace}$$

represents the quantity of PRBs in the interlace.

Case 3: The quantity upper limit P meets the following relationship:

$$P=\min\{N_{interlace},\lfloor L/2\rfloor\},\text{ or }P=\min\left\{N_{interlace},\frac{[L-(L\bmod 2)]}{2}\right\}.$$

$N_{interlace}$ represents a quantity of interlaces available for the feedback channel, or represents a quantity of interlaces that can be used to send the feedback information, and L represents the upper limit of the quantity of transmissions.

$$\frac{[L-(L\bmod 2)]}{2}$$

is a variation of the formula $\lfloor L/2\rfloor$. $\lfloor L/2\rfloor$ may have another variant form. A specific variant for is not limited in this application.

S103: The receiver device decodes the N TBs.

That the receiver device decodes the TBs includes the following several cases: All the N TBs fail to be decoded, or all the N TBs are successfully decoded, or the N TBs include both a TB that fails to be decoded and a TB that is successfully decoded.

S104: The receiver device sends the feedback information for the M TBs in the N TBs based on the parameter of the interlace and the upper limit of the quantity of transmissions.

M is a positive integer, M is less than or equal to N, and M is less than or equal to the quantity upper limit P of the feedback information sent by the receiver device.

Optionally, P may also be referred to as a maximum quantity of PSFCH feedbacks, a transmission capability upper limit, a maximum quantity of feedbacks, or the like.

It may be understood that after decoding the N TBs, the receiver device may determine, based on the upper limit of the quantity of transmissions and the parameter of the interlace, the quantity upper limit P for sending the feedback information, determine, based on the quantity upper limit P, a quantity M of pieces of feedback information fed back to the transmitter device, and feed back M pieces of feedback information to the transmitter device, to feed back a decoding status to the transmitter device. For example, if the receiver device determines that the quantity upper limit P of feedback information that can be sent is 3, when subsequently feeding back an ACK or a NACK to the transmitter device, the receiver device feeds back a maximum of three pieces of feedback information to the transmitter device.

With reference to the foregoing case 1 to case 3, the following describes a specific implementation of sending the feedback information by the receiver device.

Corresponding to the case 1, that the receiver device sends the feedback information may be implemented as: sending the feedback information through Q PRBs in a first interlace, where the interlace includes the first interlace. Q is a positive integer; and $$Q=\left\lfloor\frac{N_{PRB}^{bandwidth}}{GAP}\right\rfloor,\text{ or }Q=\left\lceil\frac{N_{PRB}^{bandwidth}}{GAP}\right\rceil,$$

or Q is a preconfigured parameter, for example, 2.

$$N_{PRB}^{bandwidth}$$

represents the quantity of PRBs in the bandwidth occupied by data transmission, and GAP represents a gap between adjacent PRBs in one interlace. In other words, for an interlace, the feedback information may be sent by occupying Q PRBs in a plurality of PRBs included in the interlace.

For example, a communication bandwidth is 20 MHz (a quantity of PRBs included in the communication bandwidth, namely, $$N_{PRB}^{bandwidth},$$

is 106), a quantity of RBs between PRBs in the interlace (namely, GAP) is 25, and the receiver device can send a PSFCH for a maximum of 12 times (that is, an upper limit L of a quantity of transmissions is 12). As shown in FIG. 7, the interlace may include five PRBs. When the receiver device sends one piece of feedback information (an ACK or a NACK) through the interlace, at least $$Q=\left\lfloor\frac{N_{PRB}^{bandwidth}}{GAP}\right\rfloor=\left\lfloor\frac{106}{25}\right\rfloor=4$$

PRBs need to be occupied, that is, the feedback information needs to be sent through the four PRBs in the interlace. In other words, each piece of feedback information needs to be repeatedly sent four times on the four PRBs, and every four PSFCH transmissions are used to support feedback of one piece of feedback information.

Therefore, 12 PSFCH transmissions (namely, L) are actually used to support feedback of a maximum of $$P=\left\lfloor\frac{L}{\left\lfloor\frac{N_{PRB}^{bandwidth}}{GAP}\right\rfloor}\right\rfloor=\left\lfloor\frac{12}{4}\right\rfloor=3$$

pieces of feedback information, that is, the receiver device may determine that a maximum of three pieces of feedback information is supported (that is, the quantity upper limit of feedback information is 3).

The foregoing uses an example in which the quantity upper limit P of feedback information is calculated according to this formula $$P=\left\lfloor\frac{L}{\left\lfloor\frac{N_{PRB}^{bandwidth}}{GAP}\right\rfloor}\right\rfloor.$$

In some other embodiments, P may also be calculated according to this formula $$P=\left\lfloor\frac{L-1}{\left\lfloor\frac{N_{PRB}^{bandwidth}}{GAP}\right\rfloor}\right\rfloor+1,$$

namely, $$P=\left\lfloor\frac{L-1}{\left\lfloor\frac{N_{PRB}^{bandwidth}}{GAP}\right\rfloor}\right\rfloor+1=\left\lfloor\frac{12-1}{\left\lfloor\frac{106}{25}\right\rfloor}\right\rfloor+1=\left\lfloor\frac{11}{4}\right\rfloor+1=3.$$

Figure 8:
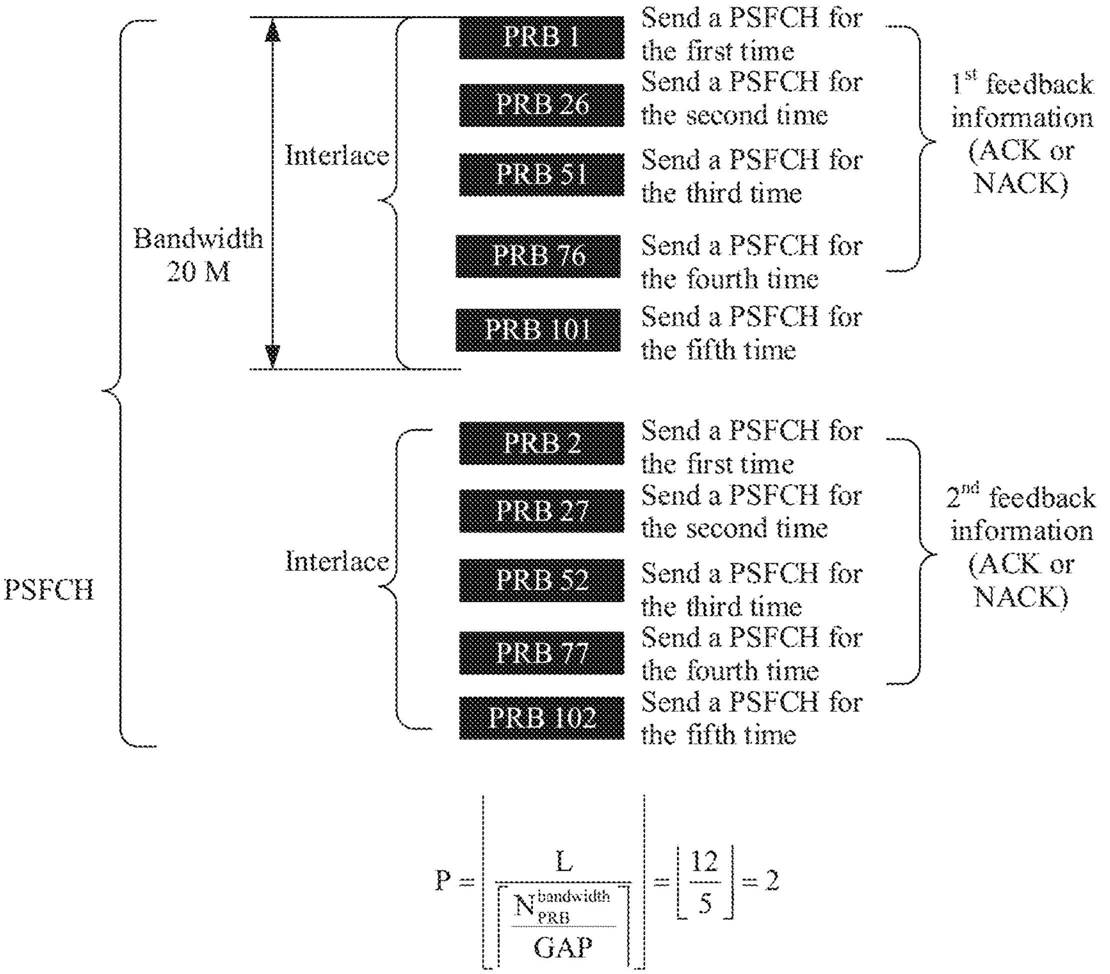

For another example, as shown in FIG. 8, the receiver device sends one piece of feedback information through the interlace, and occupies $$\left\lceil\frac{N_{PRB}^{bandwidth}}{GAP}\right\rceil=\left\lceil\frac{106}{25}\right\rceil=5$$

PRBs. In other words, the receiver device needs to send the feedback information through the five PRBs in the interlace, and each piece of feedback information needs to be repeatedly sent for five times.

Therefore, as shown in FIG. 8, 12 PSFCH transmissions (namely, L) are actually used to support feedback of a maximum of $$P=\left\lfloor\frac{L}{\left\lceil\frac{N_{PRB}^{bandwidth}}{GAP}\right\rceil}\right\rfloor=\left\lfloor\frac{12}{5}\right\rfloor=2$$

pieces of feedback information. In this case, two PSFCH transmissions may remain, and the receiver device may complete the remaining two PSFCH transmissions on an interlace with an idle PRB. For example, the remaining two PSFCH transmissions may be completed on an idle PRB 101 and an idle PRB 77 in FIG. 9(*a*) and FIG. 9(*b*).

Alternatively, the receiver device may calculate P according to this formula $$P=\left\lfloor\frac{L-1}{\left\lceil\frac{N_{PRB}^{bandwidth}}{GAP}\right\rceil}\right\rfloor+1,$$

namely, $$P=\left\lfloor\frac{L-1}{\left\lceil\frac{N_{PRB}^{bandwidth}}{GAP}\right\rceil}\right\rfloor+1=\left\lfloor\frac{11}{5}\right\rfloor+1=3.$$

Alternatively, the receiver device may calculate P according to this formula $$P=\left\lceil\frac{L}{N_{PRB}^{interlace}}\right\rceil.$$

For example, when L=12, and $$P=\left\lceil\frac{L}{N_{PRB}^{interlace}}\right\rceil=\left\lceil\frac{12}{5}\right\rceil=3.$$

In some embodiments, when $$Q=\left\lfloor\frac{N_{PRB}^{bandwidth}}{GAP}\right\rfloor,$$

and PRBs (denoted as X) included in the first interlace are greater than Q, the receiver device may send the feedback information through some or all of the PRBs included in the interlace. In other words, for an interlace, a quantity of PRBs included in the interlace may be different from or the same as a quantity of PRBs used to send the feedback information in the interlace.

Optionally, in some examples, it is considered that the quantity of PRBs (namely, $$N_{PRB}^{bandwidth})$$

in the communication bandwidth may not be exactly divided by a quantity of PRBs between adjacent PRBs in the interlace (namely, GAP), some interlaces occupy $$Q=\left\lfloor\frac{N_{PRB}^{bandwidth}}{GAP}\right\rfloor$$

PRBs for feedback, and another interlace occupies $$Q=\left\lceil\frac{N_{PRB}^{bandwidth}}{GAP}\right\rceil$$

PRBs for feedback. When $$Q = \left\lfloor \frac{N_{PRB}^{bandwidth}}{GAP} \right\rfloor,$$

to send the feedback information as much as possible, the receiver device may send the feedback information only on Q PRBs in the interlace when PRBs included in one interlace are greater than Q, and do not send the feedback information on a remaining PRB in the interlace.

Optionally, when the PRBs included in the interlace are greater than $$\left\lfloor \frac{N_{PRB}^{bandwidth}}{GAP} \right\rfloor,$$

the sending, by the receiver device, the feedback information only on $$\left\lfloor \frac{N_{PRB}^{bandwidth}}{GAP} \right\rfloor$$

PRBs in the interlace may be implemented as: sending the feedback information on first $$\left\lfloor \frac{N_{PRB}^{bandwidth}}{GAP} \right\rfloor$$

PRBs in the interlace; or sending the feedback information on last $$\left\lfloor \frac{N_{PRB}^{bandwidth}}{GAP} \right\rfloor$$

PRBs in the interlace; or sending the feedback information on any $$\left\lfloor \frac{N_{PRB}^{bandwidth}}{GAP} \right\rfloor$$

PRB in the interlace. Optionally, $$\left\lfloor \frac{N_{PRB}^{bandwidth}}{GAP} \right\rfloor$$

PRBs used to send the feedback information in the interlace include a PRB with a highest frequency band and a PRB with a lowest frequency band in the interlace. Alternatively, the feedback information is sent on $$\left\lfloor \frac{N_{PRB}^{bandwidth}}{GAP} \right\rfloor$$

PRBs including two PRBs at a lowest frequency domain position and a highest frequency domain position. In other words, in addition to the PRB with the highest frequency band and the PRB with the lowest frequency band, other PRBs in $$\left\lfloor \frac{N_{PRB}^{bandwidth}}{GAP} \right\rfloor$$

may be any value.

For example, as shown in FIG. 7, an interlace 1 includes five PRBs, and the receiver device may send the feedback information through only four PRBs (a PRB 1, a PRB 26, a PRB 51, and a PRB 76) in the interlace. An interlace 2 includes five PRBs, and the feedback information is sent through only four PRBs (a PRB 2, a PRB 27, a PRB 52, and a PRB 77) in the interlace. It can be learned that, compared with the technical solution corresponding to FIG. 8 in which all PRBs in the interlace are occupied to send the feedback information, and two pieces of feedback information can be fed back, in the technical solution corresponding to FIG. 7, when a quantity of available PRBs is the same, because each piece of feedback information occupies fewer PRBs, three pieces of feedback information can be fed back. In other words, more feedback information can be fed back in the solution corresponding to FIG. 7.

Optionally, in some other examples, when Q<X, in addition to sending the feedback information through the Q PRBs in the first interlace, the receiver device may further send the feedback information through a PRB other than the Q PRBs in the first interlace, where X indicates a quantity of PRBs included in the first interlace.

Figure 9A:
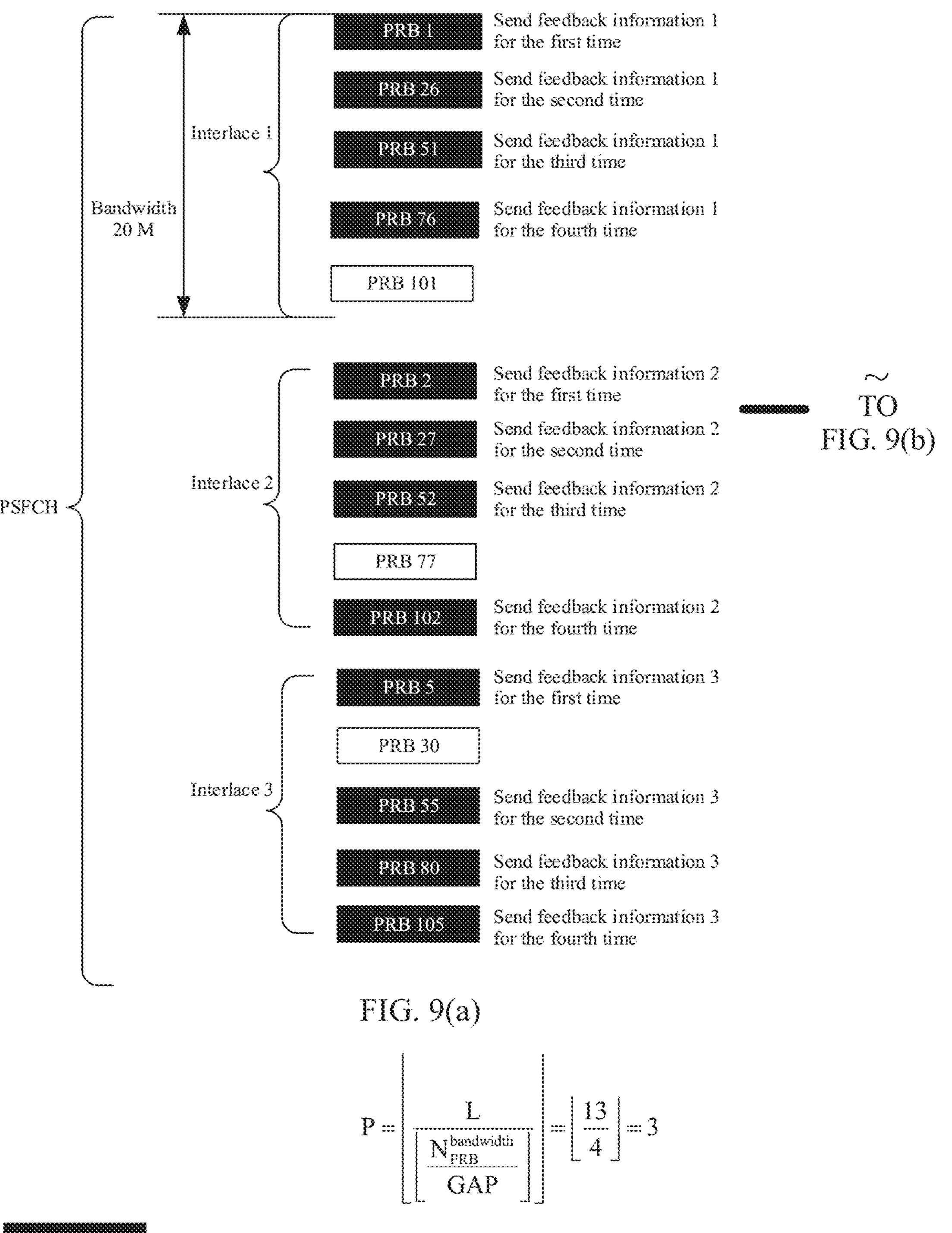
Figure 9B:
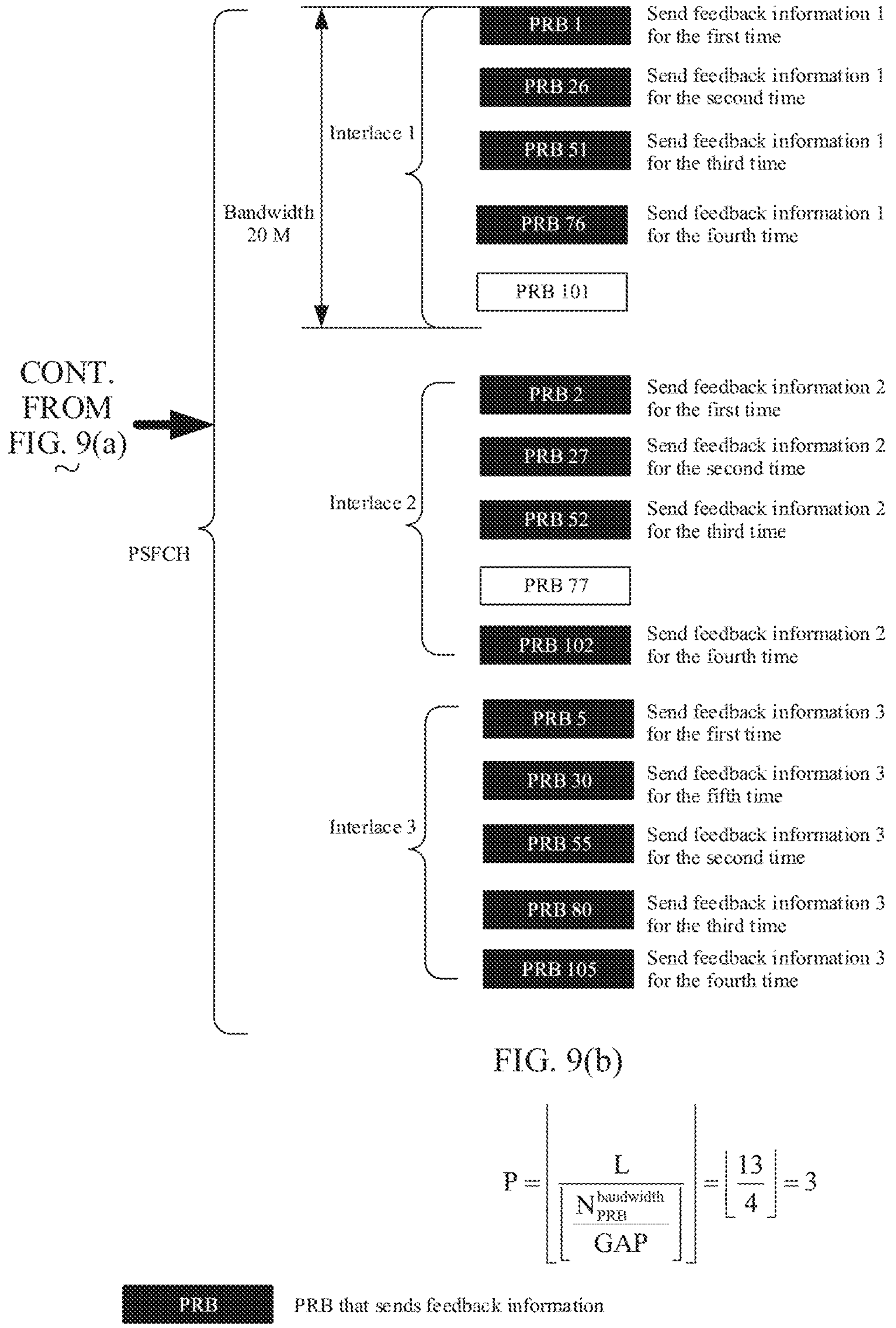

For example, in FIG. 9(*a*), if $$Q = \left\lfloor \frac{N_{PRB}^{bandwidth}}{GAP} \right\rfloor = 4,$$

and the upper limit (namely, L) of the quantity of PSFCH transmissions is 13, the receiver device may preliminarily calculate the quantity upper limit P of feedback information of the receiver device according to the foregoing formula $$P = \left\lfloor \frac{L}{\left\lfloor \frac{N_{PRB}^{bandwidth}}{GAP} \right\rfloor} \right\rfloor = \left\lfloor \frac{13}{4} \right\rfloor = 3.$$

The quantity upper limit P of feedback information is 3. It is assumed that the receiver device sends a 1$^{st}$ piece of feedback information through the four PRBs in the interlace 1, sends a 2$^{nd}$ piece of feedback information through the four PRBs in the interlace 2, and sends a 3$^{rd}$ piece of feedback information through four PRBs in an interlace 3, and a total of 12 PSFCH transmissions need to be performed for the three pieces of feedback information. In this case, a capability of one PSFCH transmission remains.

To fully use the PSFCH transmission capability and improve reliability for sending the feedback information, the receiver device may select one PRB from remaining PRBs in the interlace 1 to the interlace 3, to perform one PSFCH transmission, that is, send the feedback information once. For example, as shown in FIG. 9(*b*), the receiver device may select a PRB 30 in the interlace 3, and transmit feedback information 3 for the fifth time on the PRB 30.

Optionally, when there are idle PRBs in the interlace (for example, in FIG. 9(*a*) and FIG. 9(*b*), the idle PRBs include the PRB 101 in the interlace 1, the PRB 77 in the interlace 2, and the PRB 30 in the interlace 3), the receiver device may randomly select a part of PRBs from the idle PRBs to perform PSFCH transmission, or select a part of PRBs from the idle PRBs according to a specific policy. A specific implementation of selecting a PRB is not limited in this embodiment of this application.

Corresponding to the case 2, in a possible implementation, that the receiver device sends the feedback information may be implemented as: sending the feedback information through R PRBs in a second interlace.

R is a positive integer, the R PRBs include at least a PRB with a highest frequency band and a PRB with a lowest frequency band in the second interlace, and the interlace includes the second interlace.

Figure 10A:
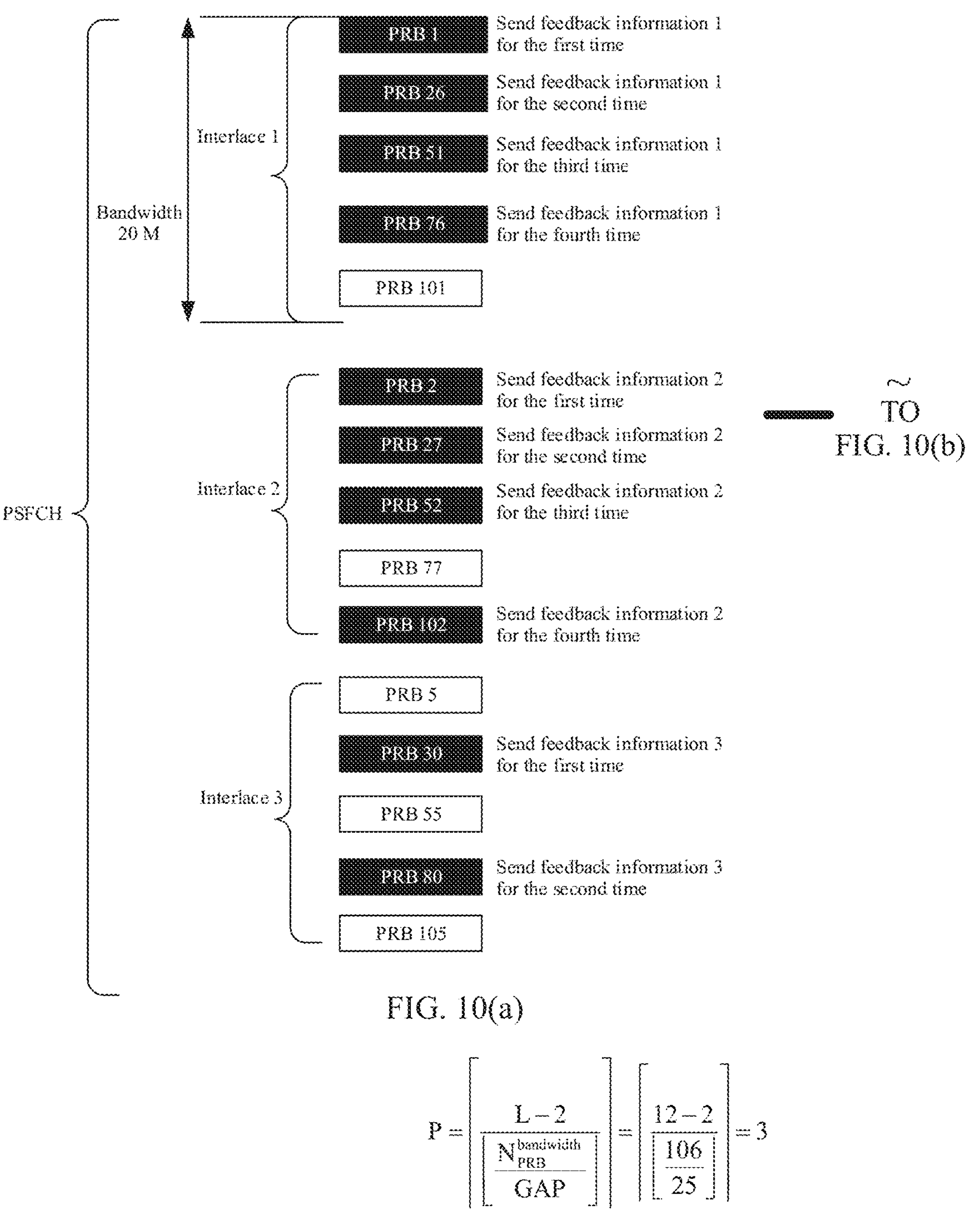
Figure 10B:
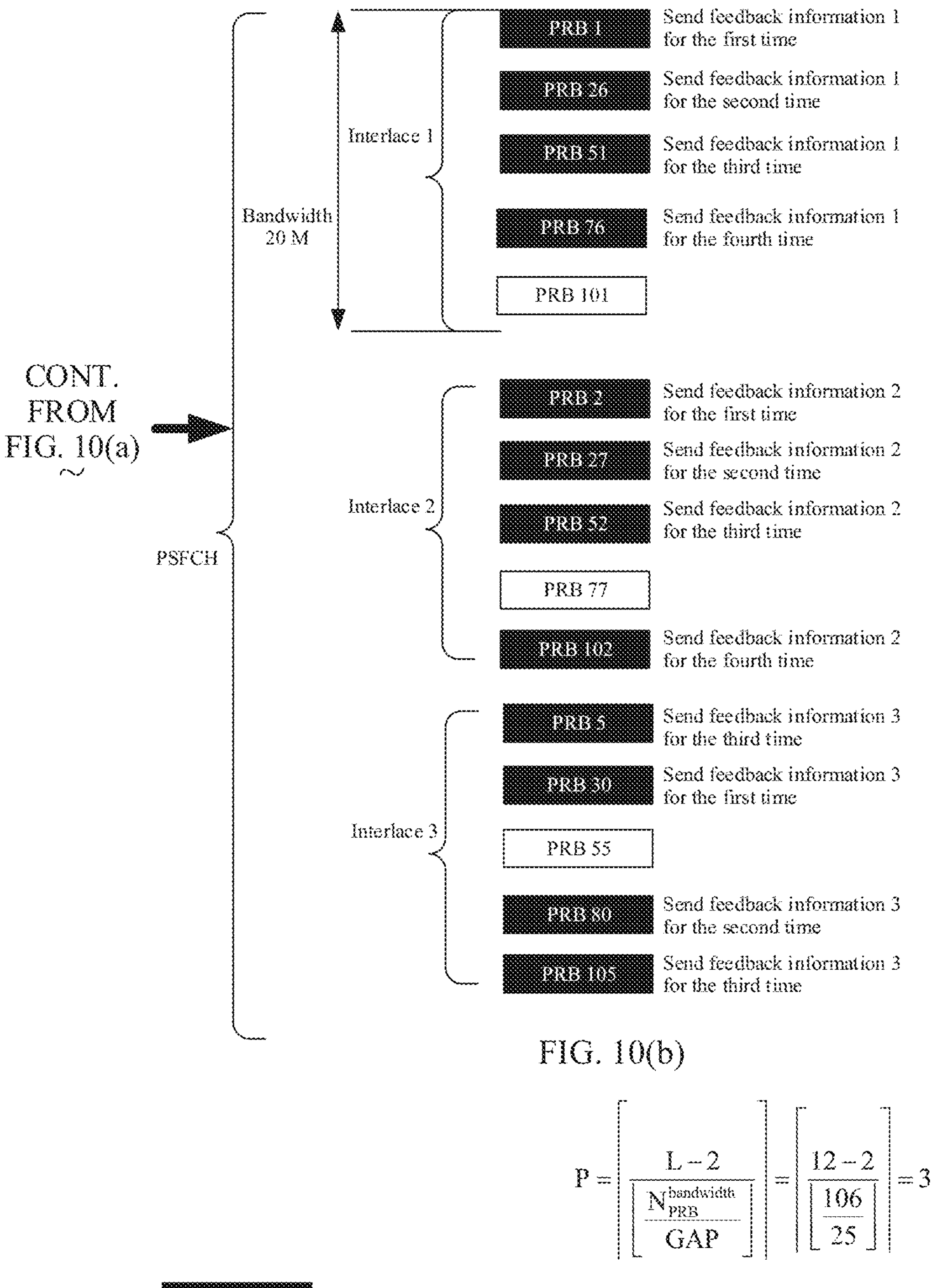

For example, in FIG. 10(*a*), the upper limit L of the quantity of transmissions is 12. After a PRB with a highest frequency band and a PRB with a lowest frequency band (corresponding to two PSFCH transmissions) in an interlace (for example, the interlace 3) are excluded, there are 10 remaining transmissions, and the receiver device calculates a quantity upper limit P of feedback information that can be sent in 10 PSFCH transmissions. That is, the receiver device calculates, according to $$P = \left\lceil \frac{L-2}{\left\lceil \frac{N_{PRB}^{bandwidth}}{GAP} \right\rceil} \right\rceil = \left\lceil \frac{12-2}{\left\lfloor \frac{106}{25} \right\rfloor} \right\rceil = 3,$$

that the quantity upper limit P of feedback information is 3.

As shown in FIG. 10(*b*), corresponding to 12 PRBs (for example, PRBs filled in black) for 12 PSFCH transmissions, any four PRBs (for example, a PRB 1, a PRB 26, a PRB 51, and a PRB 76) in the interlace 1 are used to send feedback information 1, any four PRBs (for example, a PRB 2, a PRB 27, a PRB 52, and a PRB 102) in the interlace 2 are used to send feedback information 2, a PRB 5 with the highest frequency band and a PRB 105 with the lowest frequency band in the interlace 3 are used to send the feedback information 3, and any two PRBs (for example, a PRB 30 and a PRB 80) in the interlace 3 other than the PRBs with the highest frequency band and the lowest frequency band are used to send feedback information.

It can be learned that, in the technical solution corresponding to FIG. 10(*a*) and FIG. 10(*b*), for at least one interlace (namely, the interlace 3) in a plurality of interlaces used by the receiver device, it can be ensured that at least a PRB with a highest frequency band and a PRB with a lowest frequency band in the interlace are occupied, to meet an OCB bandwidth occupation requirement.

Figure 11:
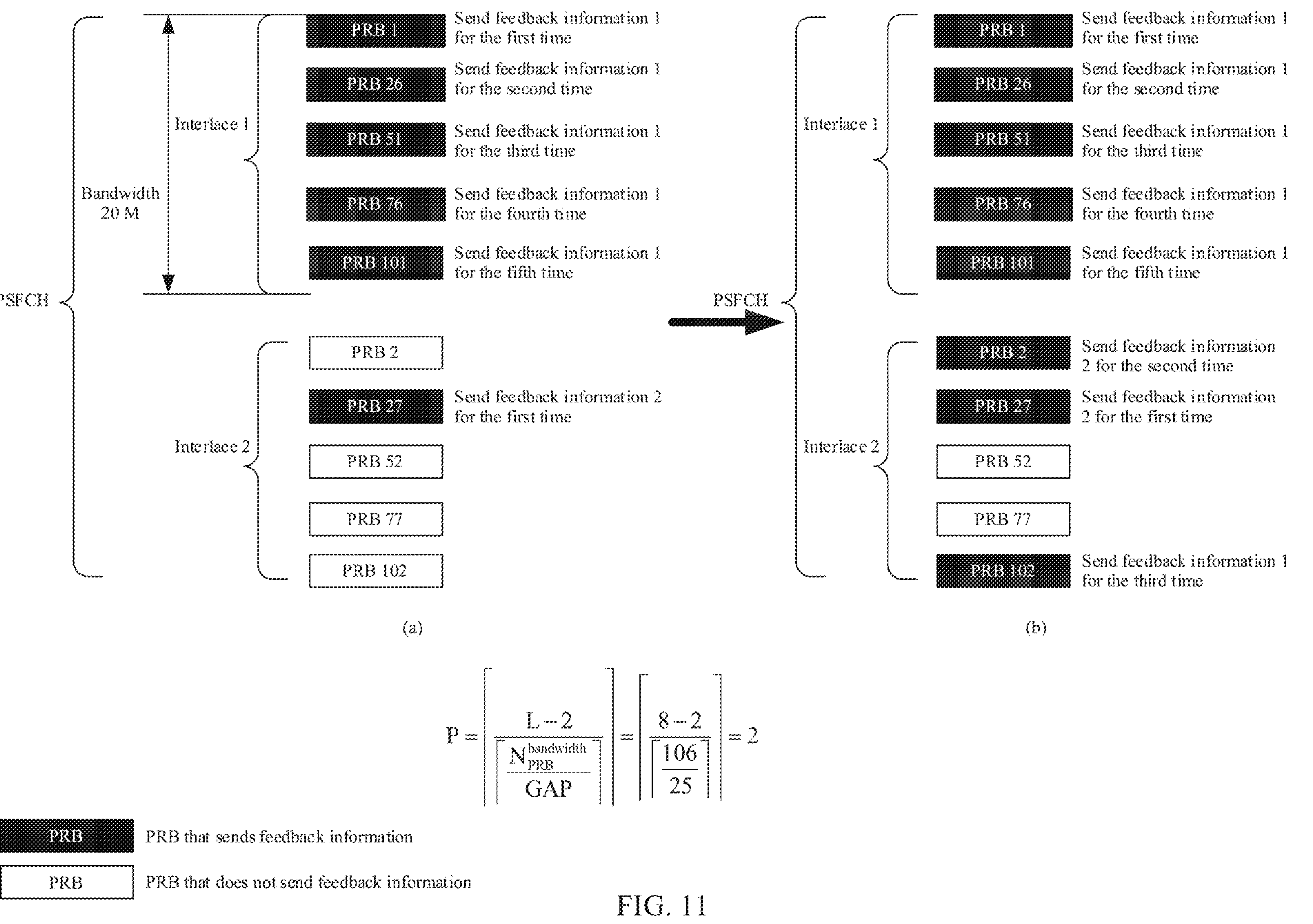

For another example, as shown in (a) in FIG. 11, the receiver device calculates, according to $$P = \left\lceil \frac{L-2}{\left\lceil \frac{N_{PRB}^{bandwidth}}{GAP} \right\rceil} \right\rceil = \left\lceil \frac{8-2}{\left\lceil \frac{106}{25} \right\rceil} \right\rceil = 2,$$

that the quantity upper limit P of feedback information is 2.

As shown in (b) in FIG. 11, corresponding to eight PRBs (for example, PRBs filled in black) for eight PSFCH transmissions, five PRBs in the interlace 1 are used to send feedback information 1, a PRB 2 with a highest frequency band and a PRB 102 with a lowest frequency band in the interlace 2 are used to send feedback information 3, and any one PRB (for example, a PRB 27) in the interlace 3 other than the PRBs with the highest frequency band and the lowest frequency band is used to send feedback information.

For another example, if L is less than a quantity of PRBs included in one interlace, for example, L=3, the receiver device may calculate, according to the formula $$P = \left\lceil \frac{L-2}{\left\lceil \frac{N_{PRB}^{bandwidth}}{GAP} \right\rceil} \right\rceil = \left\lceil \frac{3-2}{\left\lceil \frac{106}{25} \right\rceil} \right\rceil = 1,$$

that a quantity upper limit of feedback information is 1. For example, the receiver device sends the feedback information through a PRB with a highest frequency band and a PRB with a lowest frequency band in one interlace, and another PRB.

Corresponding to the case 3, that the receiver device sends the feedback information may be implemented as: sending the feedback information through a PRB with a highest frequency band and a PRB with a lowest frequency band in the first interlace. To be specific, for an interlace, only the PRB with the highest frequency band and the PRB with the lowest frequency band in the interlace are occupied to send the feedback information, and other PRBs in the interlace are not used to send the feedback information.

Figure 12:
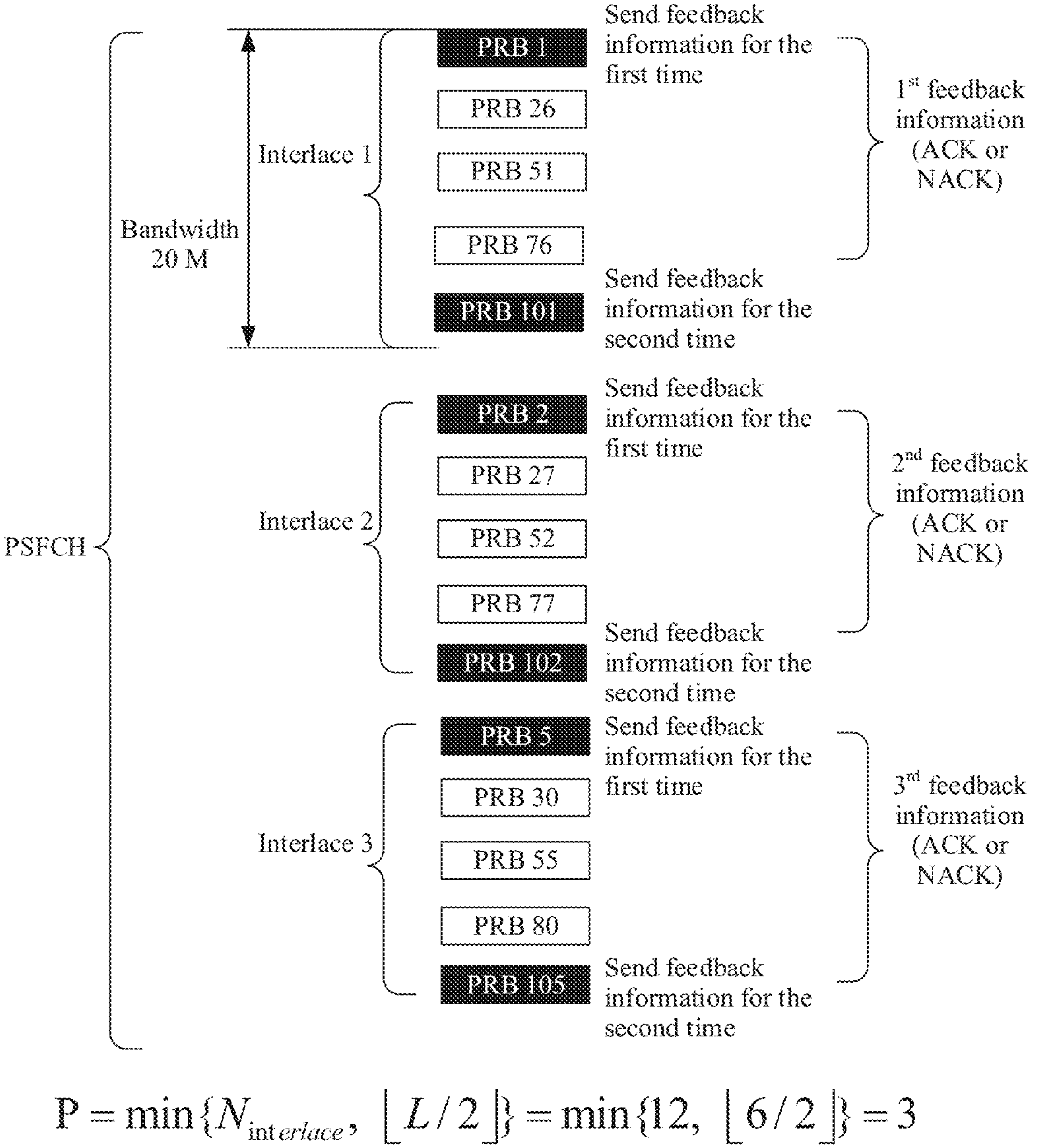

For example, as shown in FIG. 12, it is assumed that the upper limit L of the quantity of transmissions is 6, and a quantity upper limit $N_{interlace}$ of interlaces that may be used to send feedback information is 12. In this case, a quantity upper limit of feedback information that can be calculated by the receiver device is $P=\min\{N_{interlace}, \lfloor L/2 \rfloor\}=\min\{12, \lfloor 6/2 \rfloor\}=3$. The PRB 1 with the highest frequency band and the PRB 101 with the lowest frequency band in the interlace 1 are used to send the feedback information 1, the PRB 2 with the highest frequency band and the PRB 102 with the lowest frequency band in the interlace 2 are used to send the feedback information 2, and the PRB 5 with the highest frequency band and the PRB 105 with the lowest frequency band in the interlace 3 are used to send the feedback information 3.

It can be learned that, in one aspect, in some scenarios, the receiver device no longer provides a feedback for each received TB, so that signaling overheads in a HARQ process can be reduced. In the other aspect, a quantity of pieces of feedback information sent by the receiver device is less than or equal to the quantity upper limit P (P is determined based on the parameter of the interlace and the upper limit of the quantity of transmissions), so that the receiver device can transmit as much feedback information as possible when the upper limit of the quantity of transmissions and the parameter of the interlace are met, and therefore reliability of the HARQ process can be improved. In conclusion, data transmission performance can be improved.

For example, it is assumed that the receiver device feeds back a maximum of four pieces of feedback information (that is, P=4) at the same time, and decoding results of eight TBs received by the receiver device are respectively (1, 0, 0, 0, 1, 0, 0, 0), where "1" corresponds to a NACK, and "0" corresponds to an ACK. In this case, after receiving and decoding the eight TBs, the receiver device feeds back a maximum of four pieces of feedback information to the transmitter device.

In a possible implementation, when a quantity of pieces of feedback information that need to be sent is greater than P, the receiver device may determine, based on a priority of service types, to send the feedback information for P TBs whose priorities of service types are in descending order.

Figure 13:
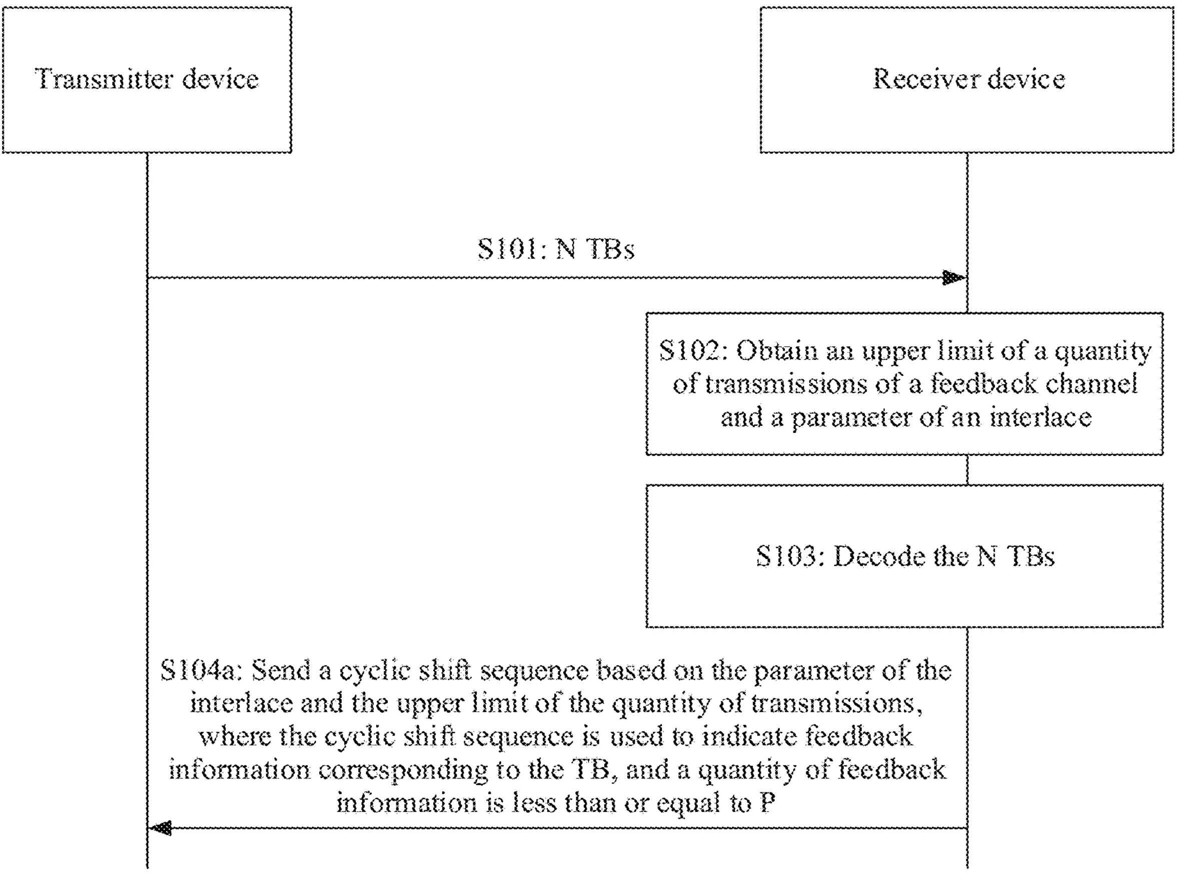
FIG. 13 is another schematic flowchart of a data transmission method according to an embodiment of this application.

In some embodiments of this application, as shown in FIG. 13, S104 may be implemented as follows: S104*a*: The receiver device sends a cyclic shift sequence based on the parameter of the interlace and the upper limit of the quantity of transmissions, where the sequence is used to carry or represent feedback information.

The following describes several methods for determining a sequence.

Method 1: The receiver device first determines a sequence pair from an available communication resource of a feedback channel, and then determines the sequence from the determined sequence pair. The sequence may include but is not limited to the cyclic shift sequence.

When the sequence is a cyclic shift sequence, the sequence pair is a cyclic shift pair, and one cyclic shift pair includes two cyclic shift sequences. The following describes the technical solutions in embodiments of this application by using an example in which a sequence is a cyclic shift sequence and a sequence pair is a cyclic shift pair. However, embodiments of this application are not limited thereto.

Optionally, the cyclic shift pair is determined based on M−1 pieces of feedback information corresponding to M−1 TBs in M TBs, and the cyclic shift pair is used to carry the feedback information of the M−1 TBs. Each cyclic shift pair includes two cyclic shift sequences.

Optionally, the cyclic shift pair is determined according to the following formula $(P_{ID}+M_{ID}+k')\bmod N_{CS}$, where $P_{ID}$ represents a source identifier of a physical layer, $M_{ID}$ represents a parameter related to a spread type, k' is a parameter related to the M−1 pieces of feedback information in the M pieces of feedback information, $N_{CS}$ represents a quantity of available cyclic shift pairs of the feedback channel, and mod represents a modulo operator.

Optionally, in a multicast scenario, $M_{ID}$ is an identifier of the receiver device, and in another scenario like unicast, $M_{ID}$ may be 0. Alternatively, a value of $M_{ID}$ may be determined based on a scenario, and this is not limited herein.

Optionally, the foregoing formula $(P_{ID}+M_{ID}+k')\text{mod}N_{CS}$ may alternatively be replaced with the following form: $(P_{ID}+M_{ID}+k'*a)\text{mod}N_{CS}$. a is used to separate adjacent feedback channels, to reduce correlation during channel detection.

It should be noted that when a in the formula $(P_{ID}+M_{ID}+k'*a)\text{mod}N_{CS}$ is equal to 1, the formula becomes the foregoing formula $(P_{ID}+M_{ID}+k')\text{mod}N_{CS}$.

Optionally, $$N_{CS}=R_{PRB,cs}^{PSFCH}*N_{slot},$$

where $$R_{PRB,cs}^{PSFCH}$$

represents a set of available resources of the feedback channel, and $N_{slot}$ represents a quantity of slots occupied by the N TBs. Optionally, the available resource of the feedback channel includes but is not limited to any one or more of the following resources: a time domain resource, a frequency domain resource, and a code domain resource.

Figure 14:
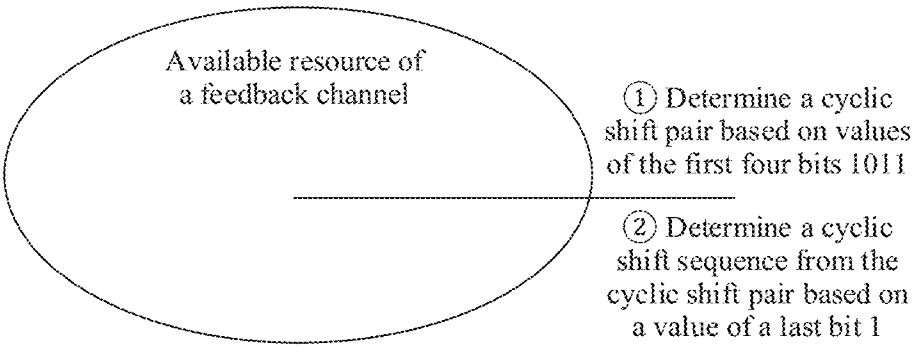
FIG. 14 is a diagram of a method for determining a cyclic shift sequence according to an embodiment of this application.

For example, it is assumed that the receiver device feeds back M=5 pieces of feedback information to the transmitter device, one piece of feedback information corresponds to one bit, and five bits corresponding to five pieces of feedback information are 10111. First, the receiver device determines a value k' of any M−1 pieces of feedback information in the M pieces of feedback information. For example, as shown in FIG. 14, the receiver device determines a value of k' (for example, 1011 is converted into a decimal value (11), and the value 11 is used as k') of any M−1=4 pieces of bit information (for example, first four pieces of bit information 1011) in M=5 pieces of bit information. Then, the receiver device substitutes the value of k' for the foregoing formula $(P_{ID}+M_{ID}+k')\bmod N_{CS}$, calculates a result, and determines a cyclic shift pair from the available resource of the feedback channel based on the calculation result.

Herein, the decimal value 11 obtained after conversion of 1011 is used as k'. In some other embodiments, k' may be further determined based on the decimal value 11, or k' may be determined in another manner. A specific calculation manner of k' is not limited in this embodiment of this application, provided that it is ensured that k' is associated with any M−1 pieces of bit information in M pieces of bit information, so that the determined cyclic shift pair can carry or represent the M−1 pieces of bit information.

Each cyclic shift pair may be used to represent a bit combination. As shown in FIG. 14, there are a total of $2^4=16$ of a bit combination including four bits. Each bit combination may be represented by a cyclic shift pair. For example, a bit combination 1011 may be represented by a cyclic shift pair A.

In this example, only one possible calculation manner of k' is listed. Alternatively, k' may be calculated in another manner based on M−1 pieces of feedback information. A specific calculation manner of k' is not limited in this embodiment of this application.

After the cyclic shift pair is determined from the available resource of the feedback channel, the receiver device may determine the cyclic shift sequence from the determined cyclic shift pair. Optionally, the cyclic shift sequence is determined based on feedback information other than the M−1 pieces of feedback information in M pieces of feedback information corresponding to the M TBs, the cyclic shift sequence is used to carry the feedback information other than the M−1 pieces of feedback information in the M pieces of feedback information. Different cyclic shift sequences represent different feedback information.

Still refer to FIG. 14. After determining the cyclic shift pair based on the first four pieces of bit information 1011, the receiver device determines the cyclic shift sequence from the determined cyclic shift pair based on a last piece of bit information. For example, the receiver device determines the cyclic shift pair A (denoted as a CSA) from the available resource of the feedback channel. It is assumed that the CSA includes a sequence A1 (denoted as a SeqA1) and a sequence A2 (denoted as a SeqA2). In an example, if the last piece of bit information is 1, the receiver device determines to use the SeqA1. If the last piece of bit information is 0, the receiver device determines to use the SeqA2.

In another example, if the last piece of bit information is 1, the receiver device determines to use the SeqA2, that is, the SeqA2 is used to represent 1. In this way, after receiving the SeqA2 from the receiver device, the transmitter device may learn that a last bit in the feedback information is 1. If the last piece of bit information is 0, the receiver device determines to use the SeqA1. The SeqA1 is used to represent 0.

It should be noted that a specific correspondence between feedback information and a cyclic shift sequence is not limited in this embodiment of this application.

Method 2: A cyclic shift sequence is determined based on M pieces of feedback information corresponding to the M TBs, and the cyclic shift sequence is used to carry the M pieces of feedback information.

In this implementation, a concept of the cyclic shift pair is no longer used, and the receiver device may directly determine a cyclic shift sequence. Different cyclic shift sequences represent different bit combinations. Different bit combinations represent different decoding statuses. For example, a cyclic shift sequence 1 represents a bit combination A, a cyclic shift sequence 2 represents a bit combination B, a cyclic shift sequence 3 represents a bit combination C, and the rest may be deduced by analogy. In this way, after receiving the cyclic shift sequence from the receiver device, the transmitter device may determine a decoding status of the receiver device based on a correspondence between a cyclic shift sequence and a bit combination.

Optionally, the cyclic shift sequence is determined according to the following formula:

$$(P_{ID}+M_{ID}+k)\bmod R_{CS}^{set};\text{ and } R_{CS}^{set}=M_{PRB,set}^{PSFCH}*b,$$

where $P_{ID}$ represents a source identifier of a physical layer, $M_{ID}$ represents a parameter related to a spread type, k is a parameter related to the M pieces of feedback information, $$R_{CS}^{set}$$

represents a quantity of available cyclic shift sequences of the feedback channel, $$M_{PRB,set}^{PSFCH}$$

represents a quantity of available PRBs of the feedback channel, and b is related to a quantity of sequences used in one PRB.

Optionally, $$R_{CS}^{set}=R_{PRB,cs}^{PSFCH}*2$$

may be understood as that one cyclic shift pair includes two cyclic shift sequences. Therefore, a quantity of available cyclic shift sequences is $$R_{PRB,cs}^{PSFCH}*2.$$

Optionally, b=12/Δ. Δ represents a gap between available cyclic shift sequences.

Optionally, the foregoing formula $$(P_{ID}+M_{ID}+k)\bmod R_{CS}^{set}$$

may alternatively be replaced with the following form:

$$(P_{ID}+M_{ID}+k*a)\bmod R_{CS}^{set}.$$

Figure 15:
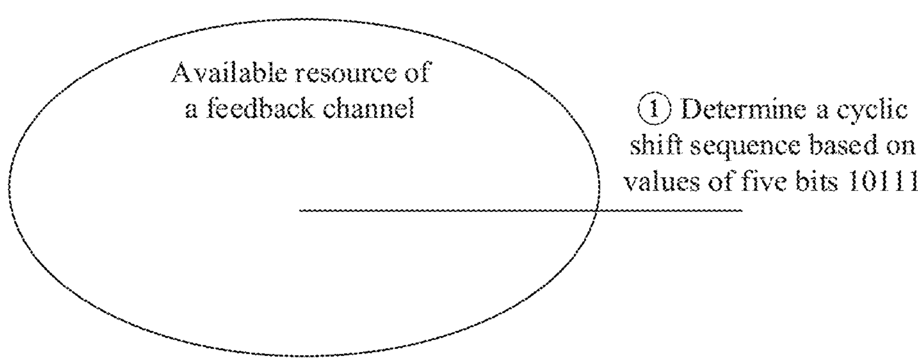
FIG. 15 is a diagram of another method for determining a cyclic shift sequence according to an embodiment of this application.

For example, as shown in FIG. 15, it is assumed that the receiver device feeds back M=5 bits to the transmitter device, and the five bits are respectively 10111. In this case, the receiver device needs to calculate a value of k based on the five bits 10111. For example, 10111 is converted into a decimal number 23, and 23 is used as k, or a value of k is determined based on the decimal number 23. Then, k is substituted into the foregoing formula $$(P_{ID}+M_{ID}+k*\alpha)\bmod R_{CS}^{set}$$

to calculate the cyclic shift sequence used to carry the feedback information.

It should be noted that in the method 1 and the method 2, a method for determining a cyclic shift sequence is mainly described by using an example in which a cyclic shift sequence is a short sequence. In some other embodiments (corresponding to a method 3), the cyclic shift sequence may alternatively be a long sequence.

The short sequence may be a sequence that occupies one PRB. The long sequence may be a sequence that occupies a plurality of PRBs. Optionally, the long sequence includes but is not limited to the following sequences: a sequence that occupies a part of or all PRBs in one interlace, and a sequence that occupies a plurality of PRBs in a plurality of interlaces.

Method 3: The feedback information is represented by using the long sequence. Optionally, a quantity of resources occupied by the long sequence may be determined based on a quantity of PRBs. For example, if a quantity of available PRBs of the feedback channel is 10, the long sequence may occupy all REs (for example, 120 REs) on the 10 PRBs. In 120 candidate long sequences corresponding to the 120 REs, the sequence is determined according to $$(P_{ID}+M_{ID}+k)\bmod R_{CS}^{set}\text{ or }(P_{ID}+M_{ID}+k*\alpha)\bmod R_{CS}^{set}.$$

k is determined based on the M pieces of feedback information, and $$R_{CS}^{set}=120,$$

that is, a quantity of available long sequences of the feedback channel is 120.

After determining the cyclic shift sequence used to indicate the feedback information, the receiver device sends the cyclic shift sequence to the transmitter device through an interlace. After receiving the cyclic shift sequence, the transmitter device may determine a decoding status of the receiver device based on the cyclic shift sequence.

Figure 16:
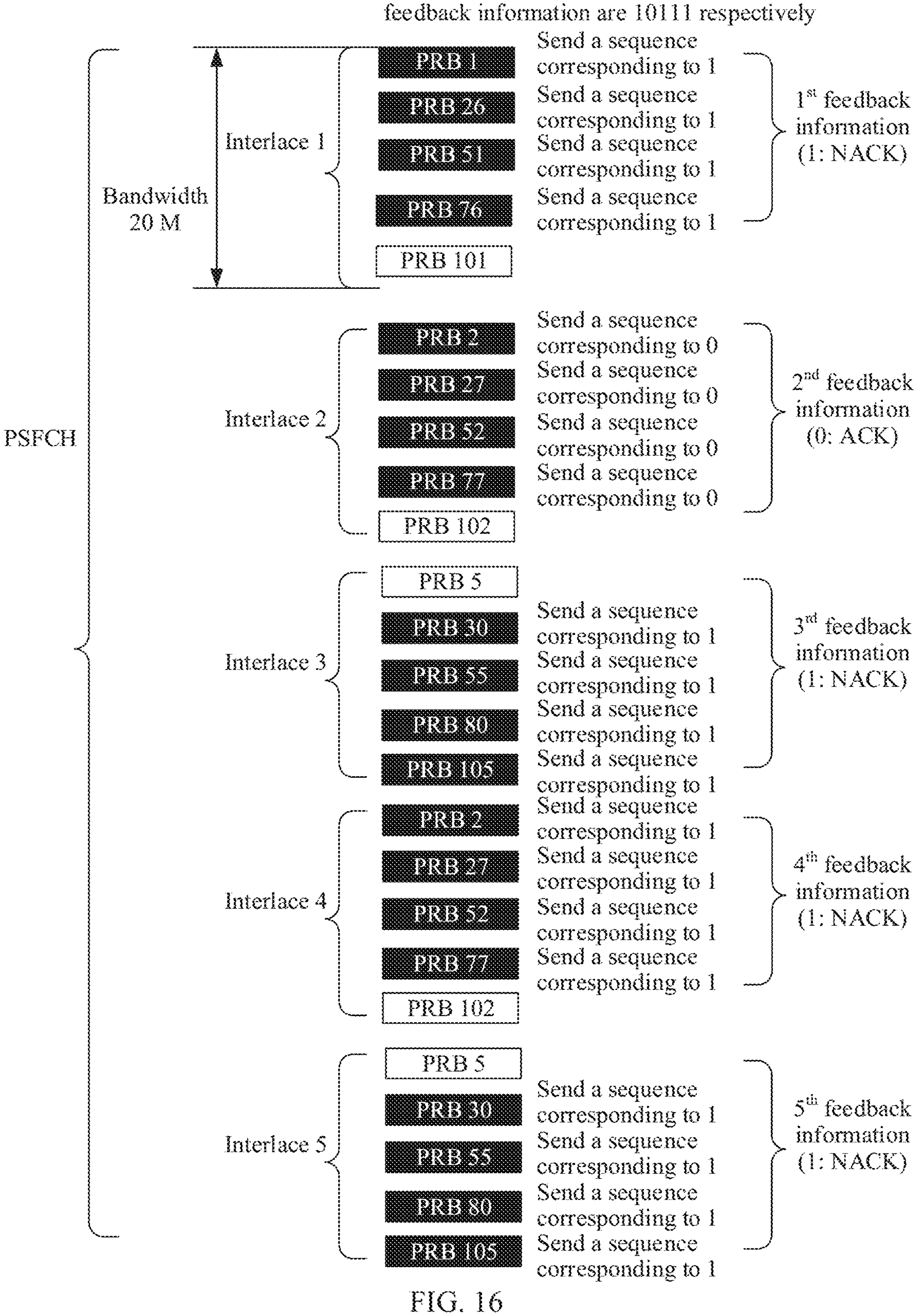
FIG. 16 is a diagram of a method for transmitting data through an interlace according to an embodiment of this application.

For example, FIG. 16 is an example of a cyclic shift sequence sent by a receiver device. It is assumed that five bits corresponding to five pieces of feedback information is 10111, where 1 corresponds to a NACK, and 0 corresponds to an ACK. For example, the receiver device may determine k' based on four bits (for example, a $2^{nd}$ bit to a $5^{th}$ bit) 0111 in the five bits, and determine a used cyclic shift pair based on k'. Next, a used cyclic shift sequence is determined from the cyclic shift pair based on a remaining one bit (for example, a $1^{st}$ bit). Similarly, k' is determined based on four bits (for example, the $1^{st}$ bit, the $3^{rd}$ bit to the $5^{th}$ bit) 1111 in the five bits, and a used cyclic shift pair is determined based on k'. Next, a used cyclic shift sequence is determined from the cyclic shift pair based on the remaining one bit (for example, the $2^{nd}$ bit) in the five bits. By analogy, a sequence used to carry each bit is determined, and each sequence is sent on a corresponding interlace.

In the foregoing embodiment, several calculation manners of a value range (namely, a quantity upper limit) of a quantity of pieces of feedback information is mainly provided from a perspective of an interlace structure. In some other embodiments of this application, a value range of the quantity of pieces of feedback information may alternatively be provided from another perspective.

Optionally, a value range of the quantity of pieces of feedback information is calculated from a perspective of a resource. Optionally, to ensure that there are sufficient cyclic shift sequences used to indicate the feedback information, a value range of M meets the following condition: $2^{M-1} \leq N_{CS}$ (inequality 1); and/or meets the following condition. $2^M \leq N_{seq}$ (inequality 2).

$N_{CS}$ represents a quantity upper limit of available cyclic shift pairs of the feedback channel, and each cyclic shift pair includes two cyclic shift sequences. $N_{seq}$ represents the quantity upper limit of the available cyclic shift sequences.

Optionally, $$N_{CS} = R_{PRB,cs}^{PSFCH} \cdot N_{slot} \cdot \; R_{PRB,cs}^{PSFCH}$$

represents a set of available resources of the feedback channel, and $N_{slot}$ represents a quantity of slots occupied by the N TBs.

In short, M is determined based on $N_{CS}$ and/or $N_{seq}$, that is, a maximum value of $N_{CS}$ and/or $N_{seq}$ is used as M.

For example, the quantity upper limit ($N_{CS}$) of the available cyclic shift pairs is 15. To ensure that the feedback information can be correctly represented, a quantity M of pieces of feedback information is at most 4.

In some examples, the receiver device determines the cyclic shift pair based on three pieces of feedback information (for example, the first three pieces of feedback information) in the M=4 pieces of feedback information. In this process, it needs to be ensured that the quantity of available cyclic shift pairs is greater than $2^3=8$. Because the quantity upper limit of cyclic shift pairs is 15, and 15>8, it can be ensured that there are sufficient available cyclic shift pairs for representing or carrying three pieces of feedback information. Then, the receiver device determines the cyclic shift sequence from the determined cyclic shift pair based on the remaining one piece of feedback information (for example, the last piece of feedback information) in the M=4 pieces of feedback information.

In this embodiment of this application, the value range of M may be determined in any one of the following manners.

Manner 1: The transmitter device sends indication information to the receiver device, where the indication information indicates the value range of M. Optionally, the indication information may explicitly indicate the value range of M, or may implicitly indicate the value range of M.

Optionally, the indication information may be a radio resource control (RRC) message. For example, an upper limit of M may be configured in the RRC message.

Optionally, the indication information further indicates a time domain end position of the N TBs (for example, a slot in which the last TB in the N TBs is located). Therefore, the receiver device may determine, based on the time domain end position of the N TBs, that M pieces of feedback information need to be fed back to the transmitter device. The indication information may be carried on a control channel. Optionally, the transmitter device sends the indication information to the receiver device through the control channel, to indicate a time domain position (for example, a slot of each TB) of each TB. Alternatively, optionally, the transmitter device sends the indication information to the receiver device through the control channel, to indicate the upper limit of M.

Optionally, the transmitter device sends the indication information in a slot of an $M^{th}$ TB through the control channel or a data channel. After receiving the indication information in the slot in which the $M^{th}$ TB is located, the receiver device learns of the value range of M. For example, if the transmitter device sends the indication information in a slot in which a $3^{rd}$ TB is located, after the receiver device receives the indication information, the receiver device determines that the upper limit of M is 3.

Optionally, the receiver device may further determine a position of the feedback channel based on the time domain end position of the N TBs.

Manner 2: The transmitter device sends N TBs to the receiver device, and the receiver device may determine, based on the N TBs and a periodicity of a PSFCH, that the M pieces of feedback information need to be fed back to the transmitter device. It is assumed that the periodicity of the PSFCH is four slots, and a time interval between the PSFCH and a PSSCH is 2. In this case, a TB received in four slots, slot n−1 to slot n−4, may be fed back in a slot n+2. For example, if the transmitter device sends a total of six TBs to the receiver device in a slot n−2, a slot n−3, and a slot n−4, the receiver device may determine, based on the periodicity of the PSFCH, that six pieces of feedback information need to be fed back for the six TBs in the slot n+2, that is, determine that a value of M is 6.

The foregoing mainly uses an example in which a PRB that is in the interlace and that is used to send the feedback information is determined from a perspective of the parameter of the interlace for description. In some other embodiments of this application, a PRB that is in the interlace and that is used to send the feedback information may be further determined from a perspective of a resource. In a possible implementation, there are a plurality of PRBs that are used to send the feedback information and that are in the interlace, and the feedback information is repeatedly transmitted on the plurality of PRBs in the interlace. In a solution in which the cyclic shift sequence is used to carry the feedback information, repeatedly transmitting the feedback information on the plurality of PRBs in the interlace means repeatedly transmitting the cyclic shift sequence on the plurality of PRBs in the interlace. A quantity $R_{repetition}$ of repeat transmissions of the cyclic shift sequence meets the following condition:

$$R_{PRB,cs}^{PSFCH} = N_{type}^{PSFCH} * N_{cs}^{PSFCH} * \left\lfloor \frac{M_{subch,slot}^{PSFCH}}{R_{repetition}} \right\rfloor.$$

$$R_{PRB,cs}^{PSFCH}$$

represents a set of available resources of the feedback channel, $$N_{type}^{PSFCH}$$

represents a quantity of subchannels occupied by the feedback channel, $$N_{cs}^{PSFCH}$$

represents a quantity of cyclic shift pairs, and $$M_{subch,slot}^{PSFCH}$$

represents a quantity of PRBs of the feedback channel in one slot of one subchannel.

Optionally, $$M_{subch,slot}^{PSFCH} = M_{PRB,set}^{PSFCH}/(N_{subch} * N_{PSSCH}^{PSFCH}).\ M_{PRB,set}^{PSFCH}$$

represents a set of available PRBs of the feedback channel, $$N_{PSSCH}^{PSFCH}$$

is determined based on the parameter sl-PSFCH-Period, and $N_{subch}$ represents a quantity of available subchannels of the feedback channel.

In this way, the cyclic shift sequence is repeatedly transmitted on the plurality of PRBs, so that an OCB transmission requirement can be met, and mutual detection is performed between terminals when a communication bandwidth of a terminal is ensured.

Optionally, when the cyclic shift sequence is repeatedly transmitted, cyclic shift hopping may be performed. To be specific, in $R_{repetition}$ transmission, there is a phase difference between a cyclic shift sequence used for an $i^{th}$ time of transmission of the feedback information and a cyclic shift sequence used for an $(i+1)^{th}$ time of transmission of the feedback information. Herein, i is a positive integer. In this way, a peak to average power ratio (PAPR) of transmitting a cyclic shift sequence by the receiver device can be reduced as much as possible, and communication performance of the receiver device can be improved.

After determining a value range of the quantity of pieces of feedback information, the receiver device may determine, based on the value range of the quantity of pieces of feedback information, a quantity of pieces of feedback information that needs to be transmitted to the transmitter device, and send the feedback information accordingly.

Optionally, in a normal communication scenario, TBs that fail to be decoded are usually less than TBs that are successfully decoded. For example, in some scenarios, a data transmission success rate is up to 90%. Therefore, the receiver device may send feedback information (for example, a NACK) for the TB that fails to be decoded as much as possible based on the value range of the quantity of pieces of feedback information. In this way, after receiving the NACK for the TB that fails to be decoded, the transmitter device may infer that a decoding result of another TB is that the TB is successfully decoded. In other words, a TB for which no decoding result is fed back may be considered as a successfully decoded TB. In this solution, because a large quantity of NACKs are fed back, and no ACK is sent or a small quantity of ACKs are fed back, a quantity of pieces of feedback information can be reduced, and signaling overheads can be reduced.

In some embodiments, it is assumed that a quantity of TBs that fail to be decoded in the N TBs received by the receiver device is S.

When S≥P, the M TBs are P TBs that fail to be decoded in the N TBs, and the feedback information corresponding to the M TBs is NACKs for the P TBs. To be specific, when there are a large quantity of TBs that fail to be decoded, the receiver device sends, to the transmitter device as much as possible, feedback information for the TBs that fail to be decoded. It is considered that a quantity upper limit of feedback information is P, and therefore the receiver device feeds back, to the transmitter device at most, feedback information for first P TBs that fail to be decoded.

For a $P^{th}$ TB whose decoding result is a NACK, in all TBs before the TB, decoding results of TBs other than the TB whose decoding result is the NACK are ACKs.

Figure 17:
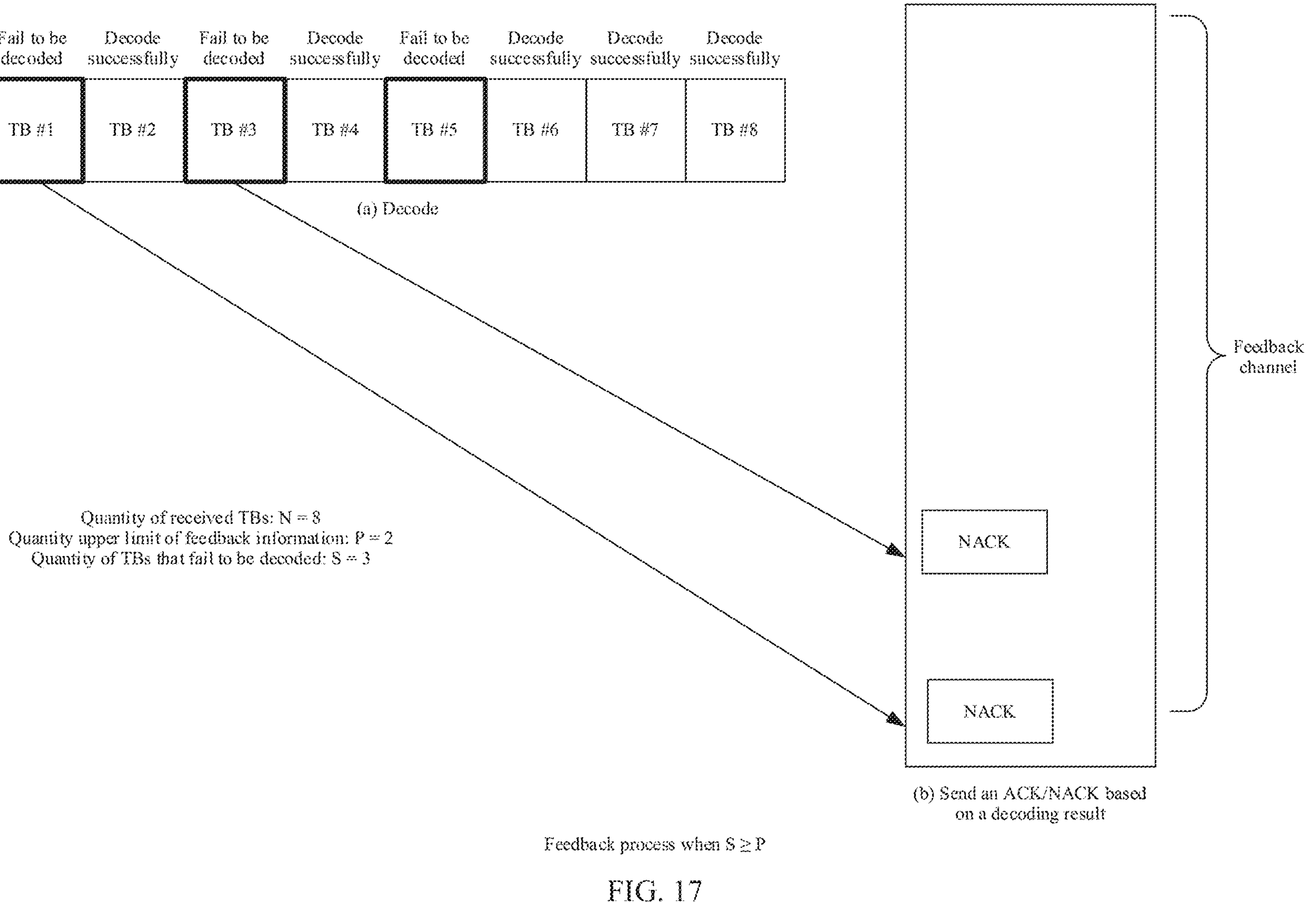
FIG. 17 to FIG. 20 are diagrams of a HARQ process according to an embodiment of this application.

For example, as shown in FIG. 17, the receiver device receives eight TBs from the transmitter device, where three TBs (S=3) fail to be decoded, and five TBs are successfully decoded. If a quantity upper limit P of feedback information is P=2, the receiver device feeds back, to the transmitter device, NACKs of first P=2 TBs that fail to be decoded at most. For example, the receiver device feeds back a NACK for a TB #1 to the transmitter device, and sends a NACK for a TB #3 to the transmitter device. For a $2^{nd}$ TB (namely, the TB #3) whose decoding result is a NACK, in all TBs before the TB #3, decoding results of all other TBs except the TB #1 whose decoding result is a NACK are ACKs. In other words, a decoding result of a TB #2 is an ACK.

Optionally, in this case, after receiving the feedback information, when retransmitting the TB, the transmitter device retransmits the first P TBs whose decoding results are NACKs.

It is assumed that the $P^{th}$ TB whose decoding result is a NACK is referred to as a target TB. Because the receiver device does not feed back a decoding result of a TB after the target TB, the transmitter device needs to retransmit the TB after the target TB.

For example, as shown in FIG. 17, in a data transmission process, the transmitter device sends eight TBs to the receiver device, and receives, from the receiver device, a decoding result NACK for the TB #1 and the TB #3. The transmitter device may infer, based on the received NACK for the TB #1 and the TB #3, that the decoding result of the TB #2 is an ACK. Then, the transmitter device needs to retransmit the TB #1 and the TB #3 whose decoding results are learned and that fail to be decoded, and further needs to retransmit the TB #4 to the TB #8 whose decoding results is not learned.

For another example, it is assumed that a quantity upper limit P of feedback information of the receiver device is 4, and decoding results of the received eight TBs are (1, 0, 1, 0, 1, 1, 0, 1). In this case, limited to a maximum of four pieces of feedback information, the receiver device feeds back NACKs corresponding to the $1^{st}$, $3^{rd}$, $5^{th}$ and $6^{th}$ TBs. Based on the NACKs of the four TBs, the transmitter device may learn that decoding results of the $2^{nd}$ and $4^{th}$ TBs are ACKs. Because the receiver device feeds back only the $6^{th}$ TB, the transmitter device does not know decoding results of the $7^{th}$ TB and the $8^{th}$ TB. During subsequent retransmission, the transmitter device needs to retransmit the $7^{th}$ TB and the $8^{th}$ TB in addition to the TB #1, the TB #3, the TB #5, and the TB #6 that learned the decoding result and that fail to be decoded.

For still another example, when all decoding results are ACKs, the receiver device feeds back an ACK corresponding to the $8^{th}$ TB.

Alternatively, when S<P, the M TBs include the S TBs, and the feedback information corresponding to the M TBs includes NACKs for the S TBs. In other words, when a quantity of TBs that fail to be decoded is small (less than the quantity upper limit P of the feedback information), the receiver device may feed back, to the transmitter device, NACKs for all TBs that fail to be decoded.

Figure 18:
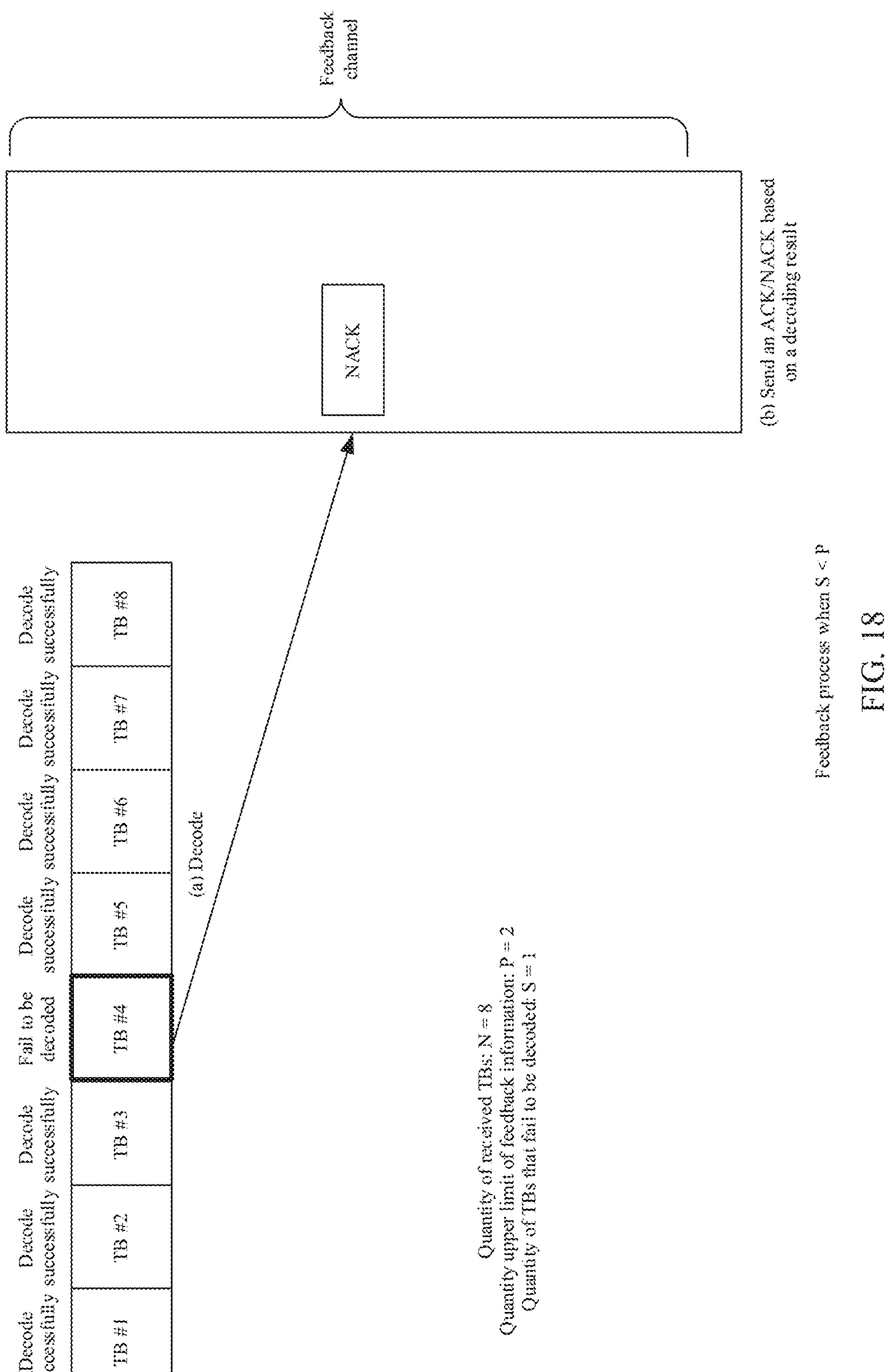

For example, it is assumed that both the transmitter device and the receiver device know that the quantity upper limit P of the feedback information is 2. As shown in FIG. 18, the receiver device receives eight TBs from the transmitter device. One TB (TB #4) fails to be decoded, and a quantity of TBs that fail to be decoded is less than the quantity upper limit P of feedback information. In this case, the receiver device feeds back, to the transmitter device, NACKs for all TBs that fail to be decoded, that is, feeds back a NACK for the TB #4. After receiving the NACK for the TB #4 from the receiver device, the transmitter device may determine, based on a decoding status of the TB #4 and the quantity upper limit P of feedback information, that only the TB #4 in the eight TBs fails to be decoded, and other TBs are all successfully decoded. It can be learned that in the technical solution in this embodiment of this application, the receiver device feeds back a small quantity of NACKs to the transmitter device, so that the transmitter device can learn of a decoding status of the receiver device, to reduce signaling overheads in a transmission process. After determining a decoding status of each TB, the transmit end retransmits the TB #4 that fails to be decoded to the receiver device.

For another example, it is assumed that the transmitter device knows that the receiver device feeds back a maximum of four PSFCHs (namely, four pieces of feedback information) at the same time, and the transmitter device receives NACKs fed back for the $1^{st}$ TB and the $4^{th}$ TB, but does not receive feedback information for other TBs. In this case, the transmitter device may learn that decoding results of the other six TBs are all ACKs. After determining a decoding status of each TB, the transmitter device retransmits, to the receiver device, the TB #1 and the TB #4 that fail to be decoded.

For another example, it is assumed that the transmitter device does not know that the quantity upper limit P of feedback information is 2. Still as shown in FIG. 18, the receiver device receives eight TBs from the transmitter device. One TB (TB #4) fails to be decoded, and a quantity of TBs that fail to be decoded is less than the quantity upper limit P of feedback information. In this case, the receiver device feeds back, to the transmitter device, NACKs for all TBs that fail to be decoded, that is, feeds back a NACK for the TB #4. After receiving the NACK for the TB #4 from the receiver device, the transmitter device retransmits, to the receiver device, the TB #4 that fails to be decoded and all TBs following the TB that fails to be decoded, namely, the TB #5 to the TB #8.

Figure 19:
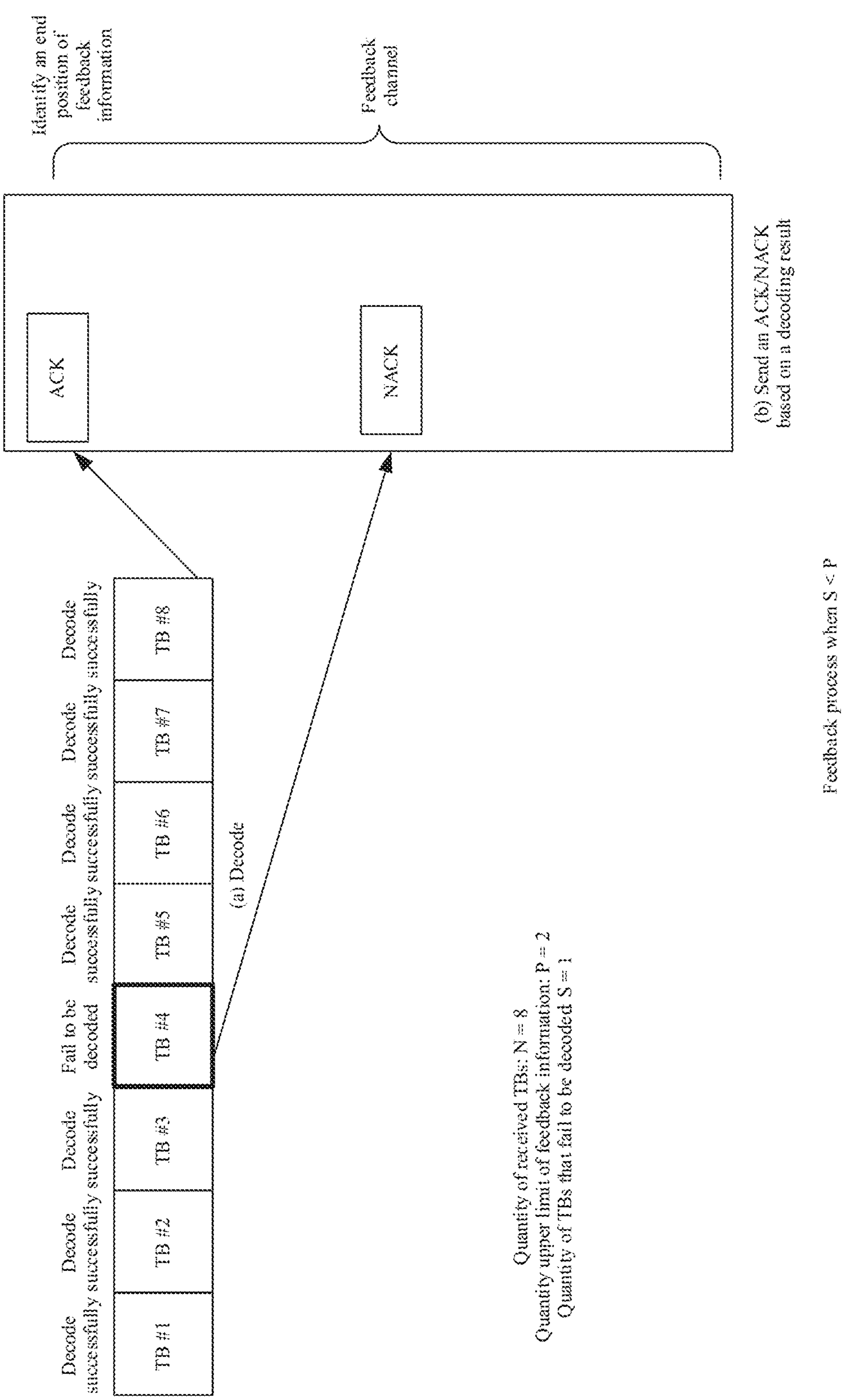

Optionally, as shown in FIG. 19, the receiver device may further feed back an ACK or a NACK for a last TB in the N TBs to the transmitter device, to identify the last TB. It indicates that before the last TB, decoding results of all other TBs except the TB for which the NACK is fed back are ACKs.

For another example, when S<P, the receiver device feeds back, to the transmitter device, feedback information of S TBs that fail to be decoded, and an ACK/NACK corresponding to the last TB in N TBs. For example, a NACK of the $1^{st}$ TB, a NACK of the $5^{th}$ TB, and an ACK of the $8^{th}$ TB are fed back, to indicate an end position of the TB received by the receiver device, and indicate that decoding results of all other TBs except the TB for which the NACK is fed back before the TB are ACKs. In this solution, during retransmission, the transmitter device retransmits the TB that fails to be decoded.

Figure 20:
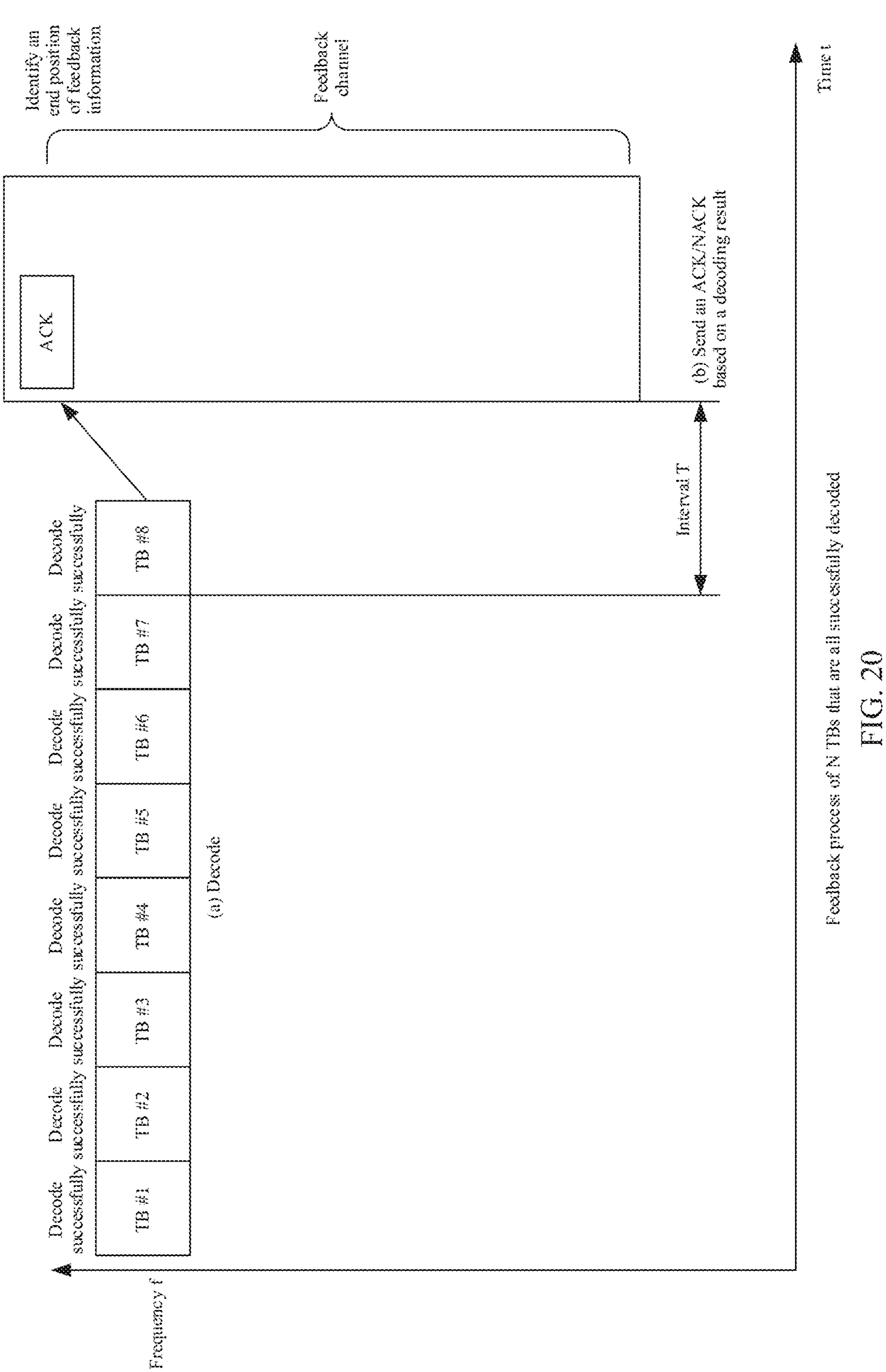

In some embodiments, if all the N TBs received by the receiver device are successfully decoded, the M TBs are a last TB in the N TBs, and the feedback information corresponding to the M TBs is an ACK for the last TB. In other words, as shown in FIG. 20, when all the TBs are successfully decoded, the receiver device feeds back, to the transmitter device, the ACK of the last TB (for example, the TB #8) in the N TBs.

In the foregoing embodiment, that the transmitter device knows the quantity upper limit P of feedback information and determines the decoding result of the receiver device based on this in cases is used as an example. In some other embodiments, whether the transmitter device knows P is no longer concerned. After receiving the feedback information of the M TBs from the receiver device, the transmitter device directly determines, based on a TB corresponding to the last piece of feedback information in M pieces of feedback information, decoding statuses of all TBs before the TB, a decoding result of a TB after the TB is considered as unknown, and the TB with an unknown decoding result is retransmitted during retransmission. Optionally, in all the TBs before the last TB, a decoding result of a TB having feedback information is a NACK, and a decoding result of a TB having no feedback information is an ACK.

In a conventional technology, if the quantity upper limit P of feedback information is 2, feedback can be performed only on decoding statuses of two TBs. For example, only decoding success statuses of the TB #1 and the TB #2 can be fed back, and decoding statuses of the TB #3 to the TB #8 cannot be fed back. In comparison with the conventional technology in which P pieces of feedback information can carry decoding results of only P TBs, in the technical solution of this embodiment of this application, NACKs are fed back as much as possible, to achieve effect of feeding back decoding statuses of more than P TBs. For example, in some examples, as shown in FIG. 18, the receiver device sends only one NACK for TB #4 to the transmitter device, so that the transmitter device can learn of a decoding status of a plurality of remaining TBs by the receiver device, and signaling overheads in a transmission process are low. In other words, a large quantity of TBs decoding results (for example, carry decoding results of TB #1 to TB #8) can be carried by using small quantity of pieces of feedback information (for example, only feedback information of TB #4).

Embodiment 2

Figures 21, 22:
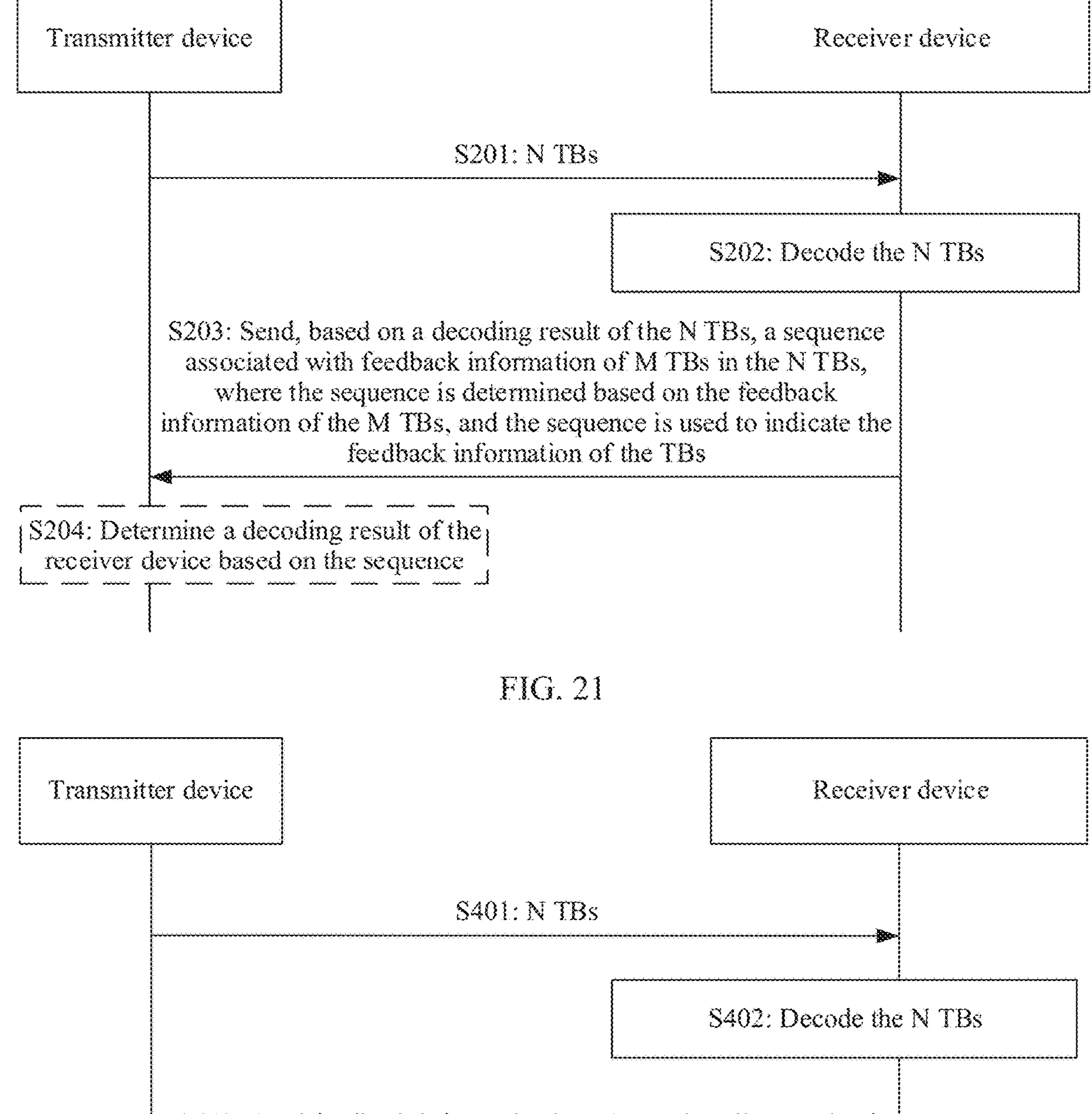
FIG. 21 is another schematic flowchart of a data transmission method according to an embodiment of this application.
FIG. 22 is another schematic flowchart of a data transmission method according to an embodiment of this application.

As shown in FIG. 21, an embodiment of this application further provides a data transmission method. The method includes the following steps.

S201: A transmitter device sends N TBs to a receiver device. Correspondingly, the receiver device receives the N TBs from the transmitter device, where N is a positive integer.

S202: The receiver device decodes the N TBs.

For a specific implementation of step S202, refer to S103. Details are not described herein again.

S203: The receiver device sends, based on a decoding result of the N TBs, a sequence associated with feedback information of M TBs in the N TBs.

In other words, that the receiver device sends the feedback information may be implemented as follows: The receiver device sends a sequence. The sequence is determined based on the feedback information of the M TBs, and the sequence is used to indicate the feedback information of the TBs. Because the sequence is determined based on the feedback information of the M TBs, and may represent the feedback information of the M TBs, after the transmitter device receives the sequence from the receiver device, the transmitter device may determine, based on an association relationship between a sequence and feedback information, that the feedback information of the receiver device is an ACK/NACK, to determine a decoding status of the receiver device.

The sequence may be determined based on the feedback information of the M TBs in two manners. In one manner, a cyclic shift pair is determined based on M−1 pieces of feedback information corresponding to M−1 TBs in the M TBs, and the cyclic shift pair is used to carry the feedback information of the M−1 TBs. Then, a cyclic shift sequence is determined based on feedback information other than the M−1 pieces of feedback information in M pieces of feedback information corresponding to the M TBs. The cyclic shift sequence is used to carry the feedback information other than the M−1 pieces of feedback information in the M pieces of feedback information. In the other manner, a cyclic shift sequence is directly determined based on the M pieces of feedback information corresponding to the M TBs, and the cyclic shift sequence is used to carry the M pieces of feedback information. For specific implementation of the two manners of determining the cyclic shift sequence, refer to related steps (for example, step S104*a*) in Embodiment 1. Details are not described herein again.

Optionally, a slot of a plurality of PSFCHs is determined based on a slot of the last one or more PSSCHs. In other words, a slot of a plurality of pieces of feedback information is determined based on a slot of a last one or more TBs. To ensure feedback effectiveness, it needs to be ensured that there is at least T slots between the slot in which the last TB is located and that is sent by the transmitter device and a slot in which a feedback channel is located. For example, as shown in FIG. 20, after receiving a last TB #8, the receiver device sends the feedback information to the transmitter device through the feedback channel at least after T slots.

Optionally, a time interval T is related to a subcarrier spacing. For example, when the subcarrier spacing is 15 kHz, the time interval T=1 slot.

Optionally, in some embodiments, before performing S203, the receiver device may further determine a value range of M, and feed back, to the transmitter device based on the value range of M and a decoding result of the N TBs, a sequence associated with the feedback information of the M TBs in the N TBs.

In a possible implementation, when transmitting the feedback information through an interlace, the receiver device may determine a quantity upper limit P of feedback information based on a parameter of the interlace, where M needs to be less than or equal to P. For a specific calculation manner of P, refer to related steps (for example, step S104) in Embodiment 1.

In a possible implementation, when the receiver device transmits data through the interlace or transmits data without using the interlace, the receiver device may determine the value range of M based on a communication resource. For example, the value range of M meets the following condition: $2^{M-1} \leq N_{CS}$; and/or meets the following condition: $2^{M} \leq N_{seq}$. For meanings of parameters in the two formulas, refer to related descriptions in Embodiment 1. Details are not described again.

Optionally, in some embodiments, that the receiver device sends the feedback information through an interlace may be implemented as: sending the feedback information through a part of or all PRBs of the interlace. For example, the feedback information is sent through $$\left\lfloor \frac{N_{PRB}^{bandwidth}}{GAP} \right\rfloor$$

PRBs in the interlace, or the feedback information is sent through $$\left\lceil \frac{N_{PRB}^{bandwidth}}{GAP} \right\rceil$$

PRBs in the interlace, or the feedback information is sent through at least a PRB with a highest frequency band of the interlace and a PRB with a lowest frequency band in the interlace.

Optionally, in some embodiments, it is assumed that a quantity of TBs that fail to be decoded in the N TBs is S. When S≥P, the M TBs are P TBs that fail to be decoded in the N TBs, and the feedback information corresponding to the M TBs is NACKs for the P TBs. It means that when there are a large quantity of TBs that fail to be decoded (greater than the quantity upper limit P of the feedback information), the receiver device feeds back feedback information for the first P TBs that fail to be decoded at most. When S<P, the M TBs include the S TBs, and the feedback information corresponding to the M TBs includes NACKs for the S TBs. It means that when a quantity of TBs that fail to be decoded is small (less than the quantity upper limit P of the feedback information), the receiver device may feed back NACKs for all TBs that fail to be decoded.

Optionally, in some embodiments, if all the N TBs are successfully decoded, the M TBs are a last TB in the N TBs, and the feedback information corresponding to the M TBs is an ACK for the last TB. It means that when all the N TBs are successfully decoded, the receiver device feeds back one ACK for only the last TB in the N TBs.

S204: The transmitter device determines a decoding result of the receiver device based on the sequence.

In a possible implementation, the transmitter device performs correlation detection on the $2^{M-1}$ cyclic shift pairs, and determines, from the cyclic shift pairs, a cyclic shift sequence whose correlation is higher than a threshold and is the highest, to determine specific values of M pieces of feedback information represented by the cyclic shift sequence.

For example, if M=3, that is, the receiver device feeds back feedback information for three TBs to the transmitter device, the transmitter device needs to perform correlation detection on $2^3=8$ cyclic shift sequences in $2^{3-1}=4$ cyclic shift pairs, to determine the decoding result of the receiver device.

Embodiment 3

As shown in FIG. 22, an embodiment of this application further provides a data transmission method. The method includes the following steps.

S401: A transmitter device sends N TBs to a receiver device. Correspondingly, the receiver device receives the N TBs from the transmitter device, where N is a positive integer.

S402: The receiver device decodes the N TBs.

For a specific implementation of step S402, refer to S103. Details are not described herein again.

S403: The receiver device sends feedback information based on a decoding result of the N TBs through a PRB of an interlace.

An occupied PRB is determined based on the feedback information. In other words, in this solution, the receiver device may determine, based on one or more pieces of feedback information, a PRB used to transmit the feedback information in one interlace, and transmit the feedback information through the determined PRB. In this case, after receiving the feedback information, the transmitter device may learn of specific feedback information based on the occupied PRB in the interlace.

Figure 23:
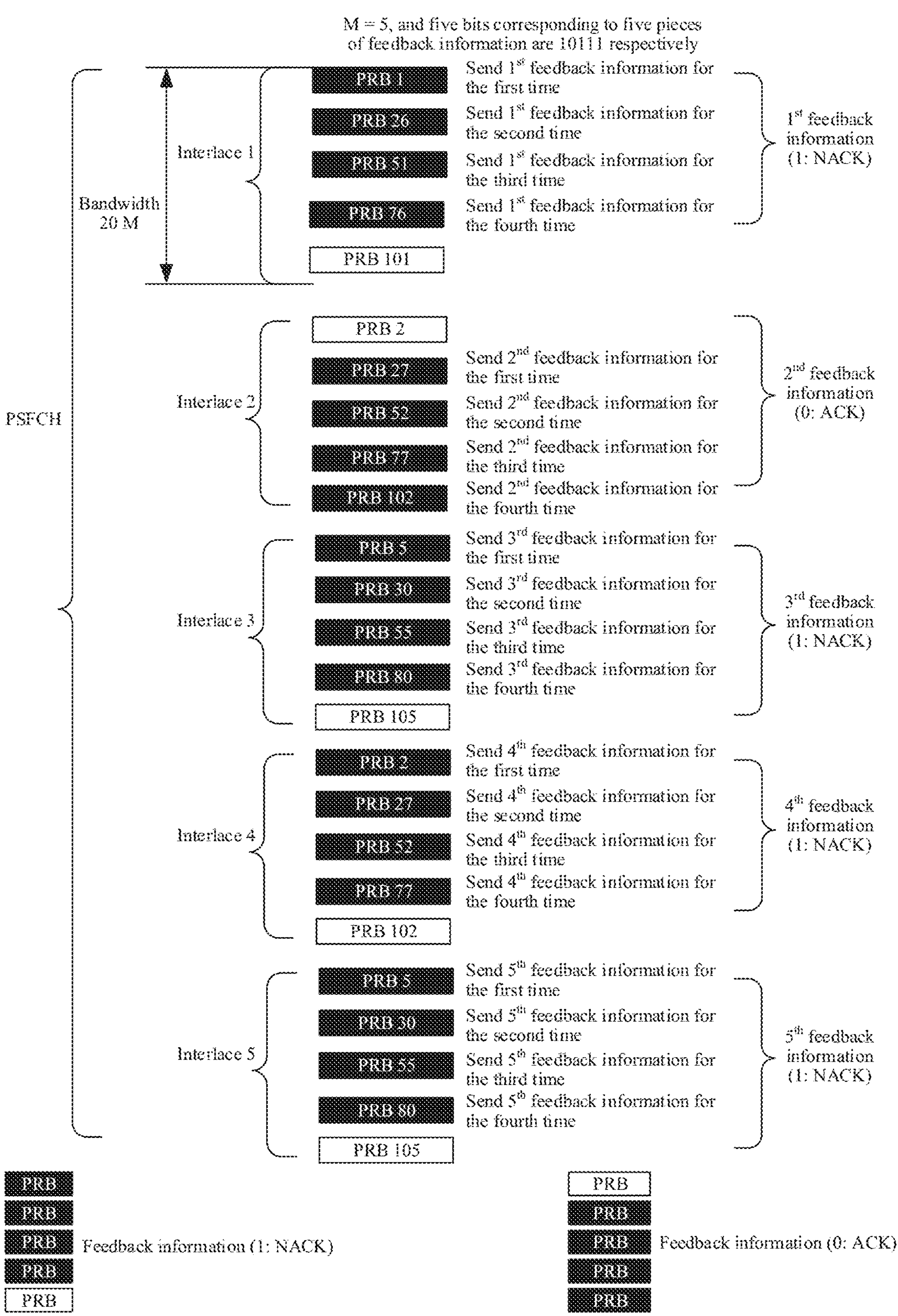
FIG. 23 is a diagram of a method for transmitting data through an interlace according to an embodiment of this application.

For example, as shown in FIG. 23, it is assumed that the interlace includes five PRBs, and it is specified that a NACK is fed back when four PRBs with a highest frequency band are occupied, and an ACK is fed back when four PRBs with a lowest frequency band are occupied. In this case, after receiving the feedback information on five interlaces shown in FIG. 23, the transmitter device may learn that the feedback information is 10111.

Optionally, sequences on a PRB with the highest frequency band and a PRB with the lowest frequency band of the interlace are used to carry or indicate one piece of feedback information in the M pieces of feedback information. In addition to the one piece of feedback information, whether a PRB other than the PRB with the highest frequency band and the PRB with the lowest frequency band is occupied may be further determined based on another part or all pieces of feedback information in the M pieces of feedback information except the one piece of feedback information.

For example, the interlace includes a PRB 1, a PRB 26, a PRB 51, a PRB 76, and a PRB 101. Sequences on the PRB 1 and the PRB 101 in the interlace are used to carry or indicate one of the M pieces of feedback information, and the another part or all of the M pieces of feedback information other than the one piece of feedback information is used to determine whether the PRB 26, the PRB 51, and the PRB 76 are occupied. For example, in the other feedback information, two pieces of feedback information are 00, indicating that the PRB 26 and the PRB 51 are occupied, two pieces of feedback information are 01, indicating that the PRB 51 and the PRB 76 are occupied, two pieces of feedback information are 10, indicating that the PRB 26 and the PRB 76 are occupied, and the other two pieces of feedback information are 11, indicating that the PRB 51, the PRB 76, and the PRB 101 are occupied.

In the foregoing Embodiment 2, a sequence is used to represent, carry, or indicate feedback information. When different sequences or sequence pairs are used, the feedback information has different meanings. In Embodiment 3, a PRB is used to represent, carry, or indicate feedback information. When different PRBs of an interlace are occupied, the feedback information has different meanings.

In some other embodiments, the feedback information may be further represented, carried, or indicated based on a combination of a PRB and a sequence. For example, the first four PRBs of an interlace 1 and an interlace 2 are also occupied. When a sequence 1 is sent through the first four PRBs of the interlace 1, it indicates that a NACK is fed back. When a sequence 2 is sent through the first four PRBs of the interlace 2, it indicates that an ACK is fed back. For another example, when a sequence 3 is fed back through the first four PRBs of an interlace 3, it indicates that an ACK is fed back. When the sequence 3 is fed back through the last four PRBs of an interlace 4, it indicates that a NACK is fed back.

Embodiment 4

Figure 24:
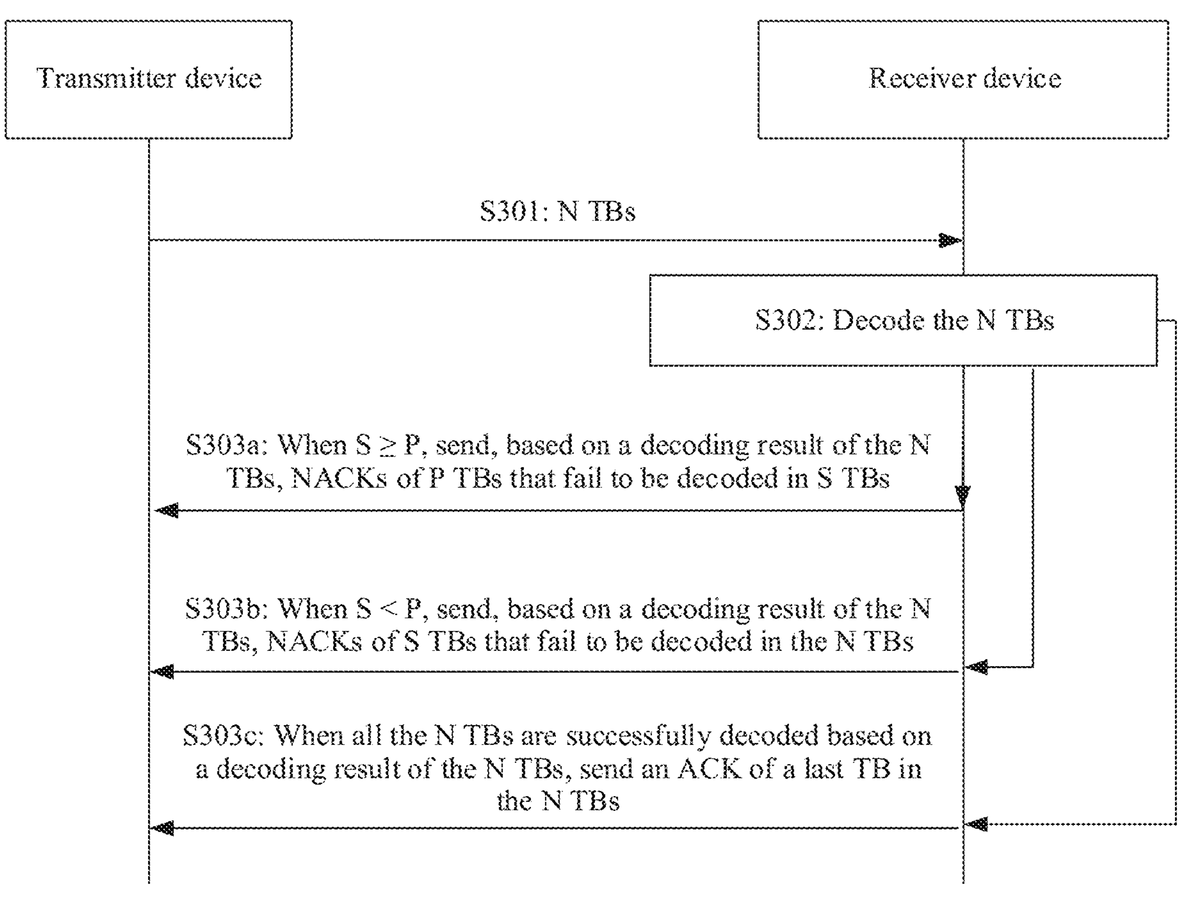
FIG. 24 is another schematic flowchart of a data transmission method according to an embodiment of this application.

As shown in FIG. 24, an embodiment of this application further provides a data transmission method. The method includes the following steps.

S301: A transmitter device sends N TBs to a receiver device. Correspondingly, the receiver device receives the N TBs from the transmitter device, where N is a positive integer.

S302: The receiver device decodes the N TBs.

For a specific implementation of step S302, refer to S103. Details are not described herein again.

S303: The receiver device sends feedback information to the transmitter device based on a decoding result of the N TBs.

S303 may include the following several cases.

S303*a*: When S≥P, the receiver device sends, based on the decoding result of the N TBs, NACKs of P TBs that fail to be decoded in S TBs.

S is a quantity of TBs that fail to be decoded in the N TBs. P is a quantity upper limit of feedback information. For a calculation manner of P, refer to related descriptions in Embodiment 1. Details are not described herein again.

It means that when there are a large quantity of TBs that fail to be decoded (greater than the quantity upper limit P of the feedback information), the receiver device feeds back feedback information for the first P TBs that fail to be decoded at most.

Optionally, when S≥P, a value range of P meets the following condition: $2^{P-1} \le N_{CS}$, and/or meets the following condition: $2^P \le N_{seq}$. It means that an available sequence sufficient to represent P NACKs needs to be ensured.

S303*b*: When S<P, the receiver device sends NACKs of S TBs in the N TBs based on the decoding result of the N TBs.

It means that when a quantity of TBs that fail to be decoded is small (less than the quantity upper limit P of the feedback information), the receiver device may feed back NACKs for all TBs that fail to be decoded.

Optionally, when S<P, a value range of S meets the following condition: $2^{S-1} \le N_{CS}$. It means that an available sequence sufficient to represent S NACKs needs to be ensured.

Optionally, as shown in FIG. 19, when S<P, the receiver device may further feed back an ACK or a NACK for a last TB in the N TBs to the transmitter device, to identify the last TB. It indicates that before the last TB, decoding results of all other TBs except the TB for which the NACK is fed back are ACKs.

S303c: When all the N TBs are successfully decoded based on the decoding result of the N TBs, the receiver device sends an ACK of the last TB in the N TBs.

It means that when all the N TBs are successfully decoded, the receiver device feeds back one ACK for only the last TB in the N TBs.

Optionally, in some embodiments, that the receiver device sends the feedback information may be implemented as: sending the feedback information through a part of or all PRBs of the interlace. For example, the feedback information is sent through $$\left\lfloor \frac{N_{PRB}^{bandwidth}}{GAP} \right\rfloor$$

PRBs in the interlace, or the feedback information is sent through $$\left\lceil \frac{N_{PRB}^{bandwidth}}{GAP} \right\rceil$$

PRBs in the interlace, or the feedback information is sent through at least a PRB with a highest frequency band in the interlace and a PRB with a lowest frequency band in the interlace.

Optionally, in some embodiments, that the receiver device sends the feedback information may be implemented as: sending a sequence, where the sequence is used to carry or represent the feedback information. There are two manners of determining the sequence. For details, refer to related descriptions in Embodiment 1. Details are not described again. For example, when S≥P, the receiver device may determine a sequence pair based on P−1 pieces of feedback information in P pieces of feedback information, and determine a sequence from the determined sequence pair based on one piece of feedback information in the P pieces of feedback information other than the P−1 pieces of feedback information. Alternatively, the receiver device may directly determine a sequence based on the P pieces of feedback information. For another example, when S<P, the receiver device may determine a sequence pair based on S−1 pieces of feedback information in S pieces of feedback information, and determine a sequence from the determined sequence pair based on one piece of feedback information in the S pieces of feedback information other than the S−1 pieces of feedback information. Alternatively, the receiver device may directly determine a sequence based on the S pieces of feedback information.

Embodiment 5

In the method for calculating a CBR mentioned above, an RSSI of a subchannel may be sensed from a $2^{nd}$ symbol within 100 ms, and the CBR is calculated based on a sensing result. This CBR calculation manner is applicable to a device or system (for example, NR) that is based on a frame or a slot to calculate a CBR. After an unlicensed spectrum is introduced, because the unlicensed spectrum may be a spectrum in another system (for example, Wi-Fi) that is not based on a frame or a slot, and Wi-Fi is not sent according to a slot structure of NR, there is a risk in the CBR calculation manner mentioned above.

It is considered that an NR system and a Wi-Fi system are not synchronous systems, and do not know a slot structure of each other, the foregoing CBR calculation solution is no longer applicable. An embodiment of this application provides a new CBR determining method. The method may be used in transmission scenarios such as PSSCH, PSCCH, and PSFCH. After a CBR value is calculated, whether to perform corresponding data or signaling transmission may be determined based on the CBR value.

In a possible implementation, the CBR may be calculated according to the following formula:

$$CBR = \frac{N_{SubChannel}^{busy\ slot}}{N_{Sub\ Channel}^{sensing\ slot}}.$$

$$N_{SubChannel}^{busy\ slot}$$

represents a quantity of busy subchannels in a time window, and $$N_{SubChannel}^{sensing\ slot}$$

represents a quantity of all subchannels in the time window. All subchannels include the busy subchannels and an idle subchannel.

$$N_{SubChannel}^{sensing\ slot} = N_{SubChannel}^{busy\ slot} + N_{SubChannel}^{idle\ slot}, \text{ where } N_{SubChannel}^{idle\ slot}$$

represents a quantity of idle subchannels in the time window.

The time window may also be referred to as a CBR window.

In this embodiment of this application, a busy subchannel is associated with a time unit, and that the subchannel is busy means that the subchannel is busy in a time unit. The time unit includes but is not limited to a sensing slot of an unlicensed spectrum. Taking a sensing slot as an example, duration of a sensing slot may be, for example, but is not limited to, 9 μs, and a terminal performs statistics on $$N_{SubChannel}^{busy\ slot} \text{ and } N_{SubChannel}^{sensing\ slot}$$

by using 9 μs as a time granularity.

Figure 25:
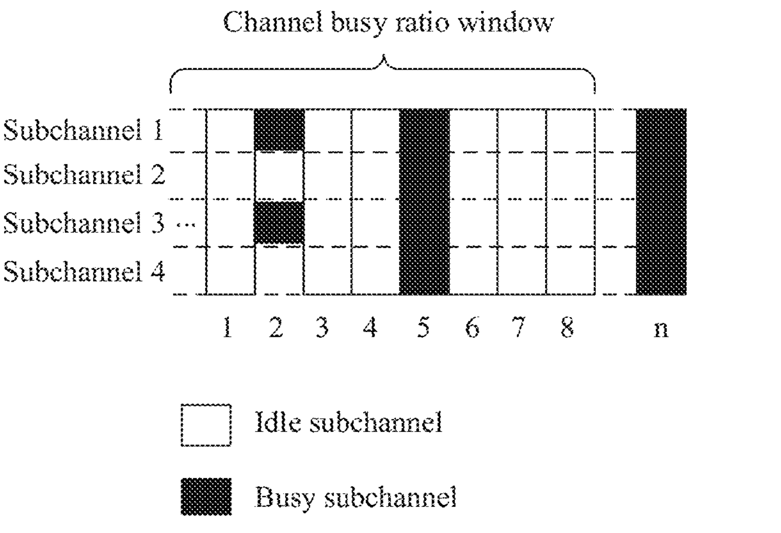
FIG. 25 is a diagram of a method for determining a channel busy ratio according to an embodiment of this application.

For example, as shown in FIG. 25, a subchannel 1 is busy in a sensing slot 2 and a sensing slot 5, and the rest may be deduced by analogy. Busy subchannels include: the subchannel 1 in the sensing slot 2, the subchannel 1 in the sensing slot 5, . . . , and a subchannel 4 in the sensing slot 5. There are a total of six busy subchannels.

Optionally, to avoid terminal power consumption caused by a sensing time unit (for example, 9 μs sensing slot) in a CBR process, the terminal may perform access through Type 1 (namely, LBT access), reuse a slot sensing result in the Type 1 access process, and calculate the CBR based on the sensing result. In this way, by reusing the slot sensing result in the Type 1 access process, the terminal may not need an additional sensing slot, to avoid extra sensing power consumption.

In a possible implementation, in the Type 1 access process, the terminal determines access by monitoring whether a channel is idle. If the channel is busy, the terminal backs off for a period of time and then performs access. Optionally, back-off duration is a sensing slot V.

During a back-off period, the terminal needs to continuously detect whether each sensing slot is busy. Each time an idle sensing slot is detected, a backoff quantity is decreased by one until the backoff quantity reaches 0, which indicates that the channel is idle and the terminal accesses the channel. For a specific Type1 access mode, refer to a conventional technology. Details are not described herein again.

Within a range of the time window, if the Type 1 access mode exists, $$N_{SubChannel}^{busy\ slot} \text{ and } N_{SubChannel}^{sensing\ slot}$$

are measured, and the CBR is calculated based on the measurement result. If the Type 1 access mode does not exist, $$N_{SubChannel}^{busy\ slot} \text{ and } N_{SubChannel}^{sensing\ slot}$$

are not measured, and the CBR is not calculated.

Figure 26:
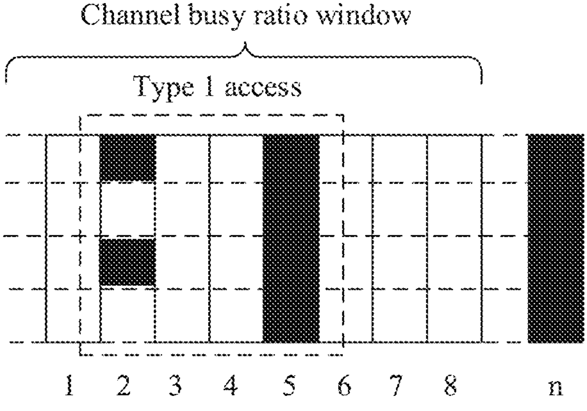
FIG. 26 is another diagram of a method for determining a channel busy ratio according to an embodiment of this application.

As shown in FIG. 26, there may be a plurality of Type 1 access times in a time window. Each time Type 1 access is performed, statistics on $$N_{SubChannel}^{busy\ slot} \text{ and } N_{SubChannel}^{sensing\ slot}$$

may be performed, and the CBR is calculated based on a measurement result.

Embodiment 5 may be combined with any one of Embodiment 1 to Embodiment 4. When it is determined that the CBR meets the condition, both receive and transmit ends transmit data or signaling.

It should be noted that some operations in a procedure of the foregoing method embodiments are optionally combined, and/or a sequence of some operations is optionally changed. In addition, an execution sequence between steps of each process is merely an example, and does not constitute a limitation on an execution sequence between the steps. The steps may alternatively be performed in another execution sequence. It is not intended to indicate that the execution order is the only order in which these operations can be performed. A person of ordinary skill in the art may learn a plurality of manners of permutating the operations described in this specification. In addition, it should be noted that process details related to an embodiment in this specification are also applicable to another embodiment in a similar manner, or different embodiments may be used in combination.

For example, in the accompanying drawings, an execution sequence between step S102 and step S103 is not limited.

In addition, some steps in the method embodiments may be equivalently replaced with other possible steps. Alternatively, some steps in the method embodiments may be optional, and may be deleted in some use scenarios. Alternatively, another possible step may be added to the method embodiment.

In addition, the foregoing method embodiments may be implemented separately or in combination.

It may be understood that, to implement the foregoing functions, network elements in embodiments of this application include corresponding hardware structures and/or software modules for performing the functions. With reference to the units and algorithm steps described in embodiments disclosed in this application, embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in embodiments of this application.

In embodiments of this application, the network elements may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that, in this embodiment of this application, division into the units is an example, and is merely a logical function division. During actual implementation, another division manner may be used.

Figure 27:
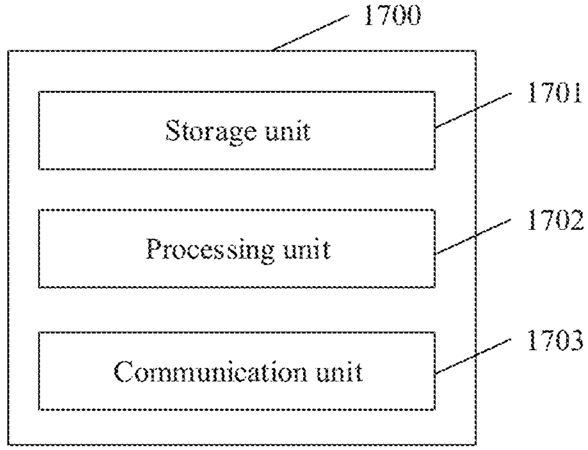
FIG. 27 is a diagram of a structure of a communication apparatus according to an embodiment of this application.

FIG. 27 is a schematic block diagram of a communication apparatus 1700 according to an embodiment of this application. The communication apparatus may be the foregoing receiver device or transmitter device. The communication apparatus 1700 may exist in a form of software, or may be a chip that can be used in a device. The communication apparatus 1700 includes: a processing unit 1702 and a communication unit 1703. Optionally, the communication unit 1703 may be further divided into a sending unit (not shown in FIG. 27) and a receiving unit (not shown in FIG. 27). The sending unit is configured to support the communication apparatus 1700 in sending information to another network element. The receiving unit is configured to support the communication apparatus 1700 in receiving information from another network element.

Optionally, the communication apparatus 1700 may further include a storage unit 1701, configured to store program code and data of the communication apparatus 1700. The data may include but is not limited to original data, intermediate data, or the like.

If the communication apparatus 1700 is a receiver device, the processing unit 1702 may be configured to support the receiver device in performing S102, S103, and the like in FIG. 6, and/or another process used in the solution described in this specification. The communication unit 1703 is configured to support communication between the receiver device and another network element (for example, the transmitter device), for example, support the receiver device in performing S101, S104, and the like in FIG. 6.

If the communication apparatus 1700 is the transmitter device, the processing unit 1702 may be configured to support the transmitter device in performing S204 in FIG. 21, and/or another process of the solution described in this specification. The communication unit 1703 is configured to support communication between the transmitter device and another network element (for example, the receiver device), for example, support the transmitter device in performing S203 in FIG. 21.

In a possible manner, the processing unit 1702 may be a controller or the processor 401 or the processor 407 shown in FIG. 5. For example, the processing unit may be a central processing unit (CPU), a general-purpose processor, a digital signal processor (DSP), an application-specific integrated circuit (ASIC), a field-programmable gate array (FPGA), or another programmable logical device, a transistor logical device, a hardware component, or any combination thereof. The processing unit 1702 may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

In a possible manner, the communication unit 1703 may be the communication interface 404 shown in FIG. 5, or may be a transceiver circuit, a transceiver, a radio frequency component, or the like.

In a possible manner, the storage unit 1701 may be the memory 403 shown in FIG. 5.

An embodiment of this application further provides a communication device, including one or more processors and one or more memories. The one or more memories are coupled to the one or more processors. The one or more memories are configured to store computer program code, and the computer program code includes computer instructions. When the one or more processors execute the computer instructions, the communication device is enabled to perform the foregoing related method steps, to implement the data transmission method in the foregoing embodiments.

An embodiment of this application further provides a chip system. The chip system includes a processor, the processor is coupled to a memory, and the memory is configured to store a program or instructions. When the program or the instructions is/are executed by the processor, the chip system is enabled to implement the method according to any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not limited in this application.

For example, the chip system may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable controller (PLD), or another integrated chip.

It should be understood that the steps in the foregoing method embodiments may be completed by using an integrated logic circuit of hardware in the processor or an instruction in a form of software. The steps of the method disclosed with reference to embodiments of this application may be directly performed by a hardware processor, or may be performed through a combination of hardware in the processor and a software module.

An embodiment of this application further provides a computer-readable storage medium. The computer-readable storage medium stores computer instructions. When the computer instructions are run on a communication device, the communication device is enabled to perform the foregoing related method steps, to implement the data transmission method in the foregoing embodiments.

An embodiment of this application further provides a computer program product. When the computer program product runs on a computer, the computer is enabled to perform the foregoing related steps, to implement the data transmission method in the foregoing embodiments.

In addition, an embodiment of this application further provides an apparatus. The apparatus may be a component or a module. The apparatus may include a processor and a memory that are connected. The memory is configured to store computer-executable instructions. When the apparatus runs, the processor may execute the computer-executable instructions stored in the memory, to enable the apparatus to perform the data transmission methods in the foregoing method embodiments.

The communication device, the computer-readable storage medium, the computer program product, or the chip provided in embodiments of this application is configured to perform the corresponding method provided above. Therefore, for beneficial effects that can be achieved, refer to the beneficial effects of the corresponding method provided above. Details are not described herein again.

It may be understood that, to implement the foregoing functions, the electronic device includes a corresponding hardware and/or software module for performing each function. With reference to algorithm steps of examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each specific application with reference to embodiments. However, it should not be considered that the implementation goes beyond the scope of this application.

In this embodiment, the electronic device may be divided into functional modules based on the foregoing method examples. For example, each functional module corresponding to each function may be obtained through division, or two or more functions may be integrated into one processing module. The integrated module may be implemented in a form of hardware. It should be noted that module division in this embodiment is an example and is merely logical function division. During actual implementation, there may be another division manner.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed apparatuses and methods may be implemented in other manners. For example, the described terminal device embodiment is merely an example. For example, division into the modules and the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the modules or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions in this application essentially, or the part contributing to the conventional technology, or all or some of the technical solutions may be represented in a form of a software product. The computer software product is stored in a storage medium and includes several instructions for instructing a computer device (which may be a personal computer, a server, a network device, or the like) or the processor to perform all or some of the steps of the methods described in embodiments of this application. The foregoing storage medium includes any medium that can store program instructions, for example, a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data transmission method, wherein the method comprises:

receiving N transport blocks (TBs), wherein N is a positive integer; and obtaining an upper limit of a quantity of transmissions of a feedback channel and a parameter of an interlace, and sending feedback information for M TBs in the N TBs through the interlace based on the parameter of the interlace and the upper limit of the quantity of transmissions, wherein M is a positive integer, M is less than or equal to N, M is less than or equal to a quantity upper limit P of feedback information sent by the a receiver device, the quantity upper limit P is determined based on the upper limit of the quantity of transmissions and the parameter of the interlace, and P is a positive integer, and wherein the quantity upper limit P meets the following condition:

$$P=\left\lfloor\frac{L}{\left\lfloor\frac{N_{PRB}^{bandwidth}}{\text{GAP}}\right\rfloor}\right\rfloor,\text{ or }P=\left\lfloor\frac{L}{\left\lceil\frac{N_{PRB}^{bandwidth}}{\text{GAP}}\right\rceil}\right\rfloor,\text{ or }P=\left\lfloor\frac{L-1}{\left\lfloor\frac{N_{PRB}^{bandwidth}}{\text{GAP}}\right\rfloor}\right\rfloor+1,$$

$$\text{or }P=\left\lfloor\frac{L-1}{\left\lceil\frac{N_{PRB}^{bandwidth}}{\text{GAP}}\right\rceil}\right\rfloor+1,\text{ or }P=\left\lfloor\frac{L}{N_{PRB}^{interlace}}\right\rfloor,\text{ or }P=\left\lfloor\frac{L-1}{N_{PRB}^{interlace}}\right\rfloor+1,$$

wherein

L represents the upper limit of the quantity of transmissions, $$N_{PRB}^{bandwidth}$$

represents a quantity of PRBs in a bandwidth occupied by data transmission, GAP represents a gap between adjacent PRBs in the interlace, and $$N_{PRB}^{interlace}$$

represents the the quantity of PRBs in the interlace.

2. The method according to claim 1, wherein the parameter of the interlace comprises at least one of a gap between adjacent physical resource blocks (PRBs) in the interlace or a quantity of PRBs in the interlace.

3. The method according to claim 1, wherein the sending feedback information comprises:

sending the feedback information through Q PRBs in a first interlace, wherein Q is a positive integer, $$Q=\left\lfloor\frac{N_{PRB}^{bandwidth}}{\text{GAP}}\right\rfloor\text{ or }Q=\left\lceil\frac{N_{PRB}^{bandwidth}}{\text{GAP}}\right\rceil,$$

and the interlace comprises the first interlace.

4. The method according to claim 3, wherein when $$Q=\left\lfloor\frac{N_{PRB}^{bandwidth}}{GAP}\right\rfloor,$$

a PRB comprised in the first interlace is greater than Q.

5. The method according to claim 4, wherein Q<X, the method further comprises:

sending the feedback information through a PRB other than the Q PRBs in the first interlace, wherein X indicates a quantity of PRBs comprised in the first interlace.

6. The method according to claim 1, wherein a value range of M meets the following condition:

$2^{M-1}\leq N_{CS}$, wherein $N_{CS}$ represents a quantity upper limit of available sequence pairs of the feedback channel, and each sequence pair comprises two sequences.

7. The method according to claim 1, wherein the method further comprises:

receiving indication information, wherein the indication information indicates an upper limit of M.

8. The method according to claim 7, wherein the indication information further indicates a time domain end position of the N TBs.

9. The method according to claim 1, wherein a sequence pair is determined based on M−1 pieces of feedback information corresponding to M−1 TBs in the M TBs, and the sequence pair is used to carry the feedback information of the M−1 TBs; and a sequence is determined based on feedback information other than the M−1 pieces of feedback information in M pieces of feedback information corresponding to the M TBs, the sequence is used to carry the feedback information other than the M−1 pieces of feedback information in the M pieces of feedback information, and the sequence pair comprises the sequence.

10. A data transmission method, wherein the method comprises:

sending N transport blocks (TBs), wherein N is a positive integer; and receiving feedback information for M TBs in the N TBs through an interlace, wherein M is a positive integer, M is less than or equal to N, M is less than or equal to a quantity upper limit P of feedback information sent by a receiver device, the quantity upper limit P is determined based on an upper limit of a quantity of transmissions and a parameter of the interlace, and P is a positive integer, and wherein the quantity upper limit P meets the following condition:

$$P=\left\lfloor\frac{L}{\left\lfloor\frac{N_{PRB}^{bandwidth}}{\mathrm{GAP}}\right\rfloor}\right\rfloor,\text{ or }P=\left\lfloor\frac{L}{\left\lceil\frac{N_{PRB}^{bandwidth}}{\mathrm{GAP}}\right\rceil}\right\rfloor,$$

$$\text{or }P=\left\lfloor\frac{L-1}{\left\lfloor\frac{N_{PRB}^{bandwidth}}{\mathrm{GAP}}\right\rfloor}\right\rfloor+1,\text{ or }P=\left\lfloor\frac{L-1}{\left\lceil\frac{N_{PRB}^{bandwidth}}{\mathrm{GAP}}\right\rceil}\right\rfloor+1,$$

$$\text{or }P=\left\lfloor\frac{L}{N_{PRB}^{interlace}}\right\rfloor,\text{ or }P=\left\lfloor\frac{L-1}{N_{PRB}^{interlace}}\right\rfloor+1,\text{ wherein}$$

L represents the upper limit of the quantity of transmissions, $$N_{PRB}^{bandwidth}$$

represents a quantity of PRBs in a bandwidth occupied by data transmission, GAP represents a gap between adjacent PRBs in the interlace, and $$N_{PRB}^{interlace}$$

represents the quantity of PRBs in the interlace.

11. The method according to claim 10, wherein the receiving feedback information comprises:

receiving the feedback information through Q PRBs in a first interlace, wherein Q is a positive integer, $$Q=\left\lfloor\frac{N_{PRB}^{bandwidth}}{GAP}\right\rfloor\text{ or }Q=\left\lceil\frac{N_{PRB}^{bandwidth}}{GAP}\right\rceil,$$

and the interlace comprises the first interlace.

12. The method according to claim 11, wherein Q<X, the method further comprises:

sending the feedback information through a PRB other than the Q PRBs in the first interlace, wherein X indicates a quantity of PRBs comprised in the first interlace.

13. The method according to claim 10, wherein the receiving feedback information comprises:

receiving the feedback information through R PRBs in a second interlace, wherein R is a positive integer, the R PRBs comprise at least a PRB with a highest frequency band and a PRB with a lowest frequency band in the second interlace, and the interlace comprises the second interlace.

14. The method according to claim 10, wherein the method further comprises:

receiving indication information, wherein the indication information indicates an upper limit of M.

15. A communication apparatus, comprising:

at least one processor; and one or more memories coupled to the at least one processor and storing programming instructions for execution by the at least one processor to cause the communication apparatus to perform operations comprising:

receiving N transport blocks TBs, wherein N is a positive integer; and obtaining an upper limit of a quantity of transmissions of a feedback channel and a parameter of an interlace, and sending feedback information for M TBs in the N TBs through the interlace based on the parameter of the interlace and the upper limit of the quantity of transmissions, wherein M is a positive integer, M is less than or equal to N, M is less than or equal to a quantity upper limit P of feedback information sent by a receiver device, the quantity upper limit P is determined based on the upper limit of the quantity of transmissions and the parameter of the interlace, and P is a positive integer, and wherein the quantity upper limit P meets the following condition:

$$P=\left\lfloor\frac{L}{\left\lfloor\frac{N_{PRB}^{bandwidth}}{\mathrm{GAP}}\right\rfloor}\right\rfloor,\text{ or }P=\left\lfloor\frac{L}{\left\lceil\frac{N_{PRB}^{bandwidth}}{\mathrm{GAP}}\right\rceil}\right\rfloor,$$

$$\text{or }P=\left\lfloor\frac{L-1}{\left\lfloor\frac{N_{PRB}^{bandwidth}}{\mathrm{GAP}}\right\rfloor}\right\rfloor+1,\text{ or }P=\left\lfloor\frac{L-1}{\left\lceil\frac{N_{PRB}^{bandwidth}}{\mathrm{GAP}}\right\rceil}\right\rfloor+1,$$

$$\text{or }P=\left\lfloor\frac{L}{N_{PRB}^{interlace}}\right\rfloor,\text{ or }P=\left\lfloor\frac{L-1}{N_{PRB}^{interlace}}\right\rfloor+1,\text{ wherein}$$

L represents the upper limit of the quantity of transmissions, $$N_{PRB}^{bandwidth}$$

represents a quantity of PRBs in a bandwidth occupied by data transmission, GAP represents a gap between adjacent PRBs in the interlace, and $$N_{PRB}^{interlace}$$

represents the quantity of PRBs in the interlace.

* * * * *